United States Patent
Ingale et al.

(10) Patent No.: US 10,897,772 B2
(45) Date of Patent: Jan. 19, 2021

(54) METHOD AND UE FOR MANAGING IN-DEVICE CO-EXISTENCE (IDC) ISSUE

(71) Applicant: Samsung Electronics Co., Ltd., Suwon-si (KR)

(72) Inventors: Mangesh Abhimanyu Ingale, Yongin-si (KR); Jaehyuk Jang, Suwon-si (KR); Sharma Neha, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/760,013

(22) PCT Filed: Sep. 12, 2016

(86) PCT No.: PCT/KR2016/010282
§ 371 (c)(1),
(2) Date: Mar. 14, 2018

(87) PCT Pub. No.: WO2017/048024
PCT Pub. Date: Mar. 23, 2017

(65) Prior Publication Data
US 2018/0263048 A1 Sep. 13, 2018

(30) Foreign Application Priority Data

Sep. 14, 2015 (IN) .......................... 4886/CHE/2015
Sep. 23, 2015 (IN) .......................... 5085/CHE/2015
Sep. 8, 2016 (IN) .......................... 4886/CHE/2015

(51) Int. Cl.
*H04W 72/12* (2009.01)
*H04W 16/14* (2009.01)
*H04W 88/06* (2009.01)

(52) U.S. Cl.
CPC ....... *H04W 72/1215* (2013.01); *H04W 16/14* (2013.01); *H04W 88/06* (2013.01)

(58) Field of Classification Search
None
See application file for complete search history.

(56) References Cited

U.S. PATENT DOCUMENTS 9,762,368 B2 * 9/2017 Narasimha ............ H04L 1/1861
2013/0301537 A1 11/2013 Lee et al.
(Continued)

FOREIGN PATENT DOCUMENTS

WO 2014/113080 A1 7/2014

OTHER PUBLICATIONS

Nokia Siemens Networks, "New cause value indicating in-Device Coexistence (IDC) interference", 3GPP Draft, R3-122152 New Cause Value for IDC 36413, 3rd Generation Partnership Project (3GPP), Mobile Competence Centre ; 650, Route Des Lucioles, F-06921 ES Lucioles, F-06921 Sophia-Antipolis Cedex, France XP050669975, Sep. 28, 2012.
(Continued)

*Primary Examiner* — Donald L Mills
(74) *Attorney, Agent, or Firm* — Jefferson IP Law, LLP

(57) ABSTRACT

Method and a UE for managing an IDC issue. The UE includes a memory, a processor, coupled to the memory and communication module based on LTE RAT, configured to transmit capability information on a licensed carrier associated with a primary cell, wherein the UE supports a LAA operation. Further, the processor, coupled to the communication module based on LTE RAT, is configured to receive an IDC indication from the primary cell served by an eNB. Further, the processor, coupled to the communication module based on LTE RAT, configured to detect the IDC issue in an unlicensed band associated with a secondary cell. Further, the processor, coupled to the communication module based on LTE RAT, configured to transmit an IDC message comprising assistance information to the primary
(Continued)

cell and receive a message to resolve the IDC issue based on the assistance information from the primary cell served by the eNB.

4 Claims, 9 Drawing Sheets

(56) References Cited

U.S. PATENT DOCUMENTS

| | | |
|---|---|---|
| 2014/0094175 A1 | 4/2014 | Susitaival et al. |
| 2014/0247759 A1 | 9/2014 | Zhang et al. |
| 2014/0287771 A1 | 9/2014 | Koo et al. |
| 2015/0382398 A1* | 12/2015 | Guo .................. H04W 52/0206 370/328 |
| 2016/0088642 A1* | 3/2016 | Yang ..................... H04W 24/08 455/451 |
| 2016/0227416 A1* | 8/2016 | Suzuki .............. H04W 72/0453 |
| 2016/0301509 A1* | 10/2016 | Narasimha ............ H04L 1/1861 |
| 2016/0309354 A1* | 10/2016 | Yerramalli ............ H04W 24/08 |
| 2016/0337904 A1* | 11/2016 | Hsu ........................ H04W 28/12 |
| 2017/0280330 A1* | 9/2017 | Martin .................. H04W 16/14 |

OTHER PUBLICATIONS

European Search Report dated Jul. 5, 2018, issued in the European Application No. 16846845.2.
Ericsson, In-device coexistence in LAA, 3GPP TSG-RAN WG2 #90, R2-152479, Fukuoka, Japan, May 15, 2015 See sections 2, 3.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 12), 3GPP TS 36.300 V12.5.0, Mar. 25, 2015 See section 23.4.2.
Indian Office Action dated, Mar. 6, 2020 issued in Indian Application No. 4886/CHE/2015.

* cited by examiner

[Fig. 1]
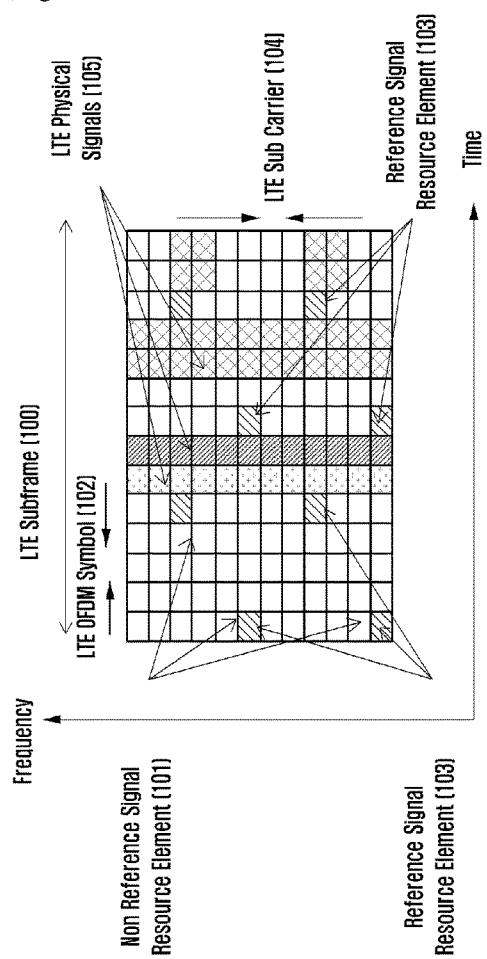
[Fig. 2]
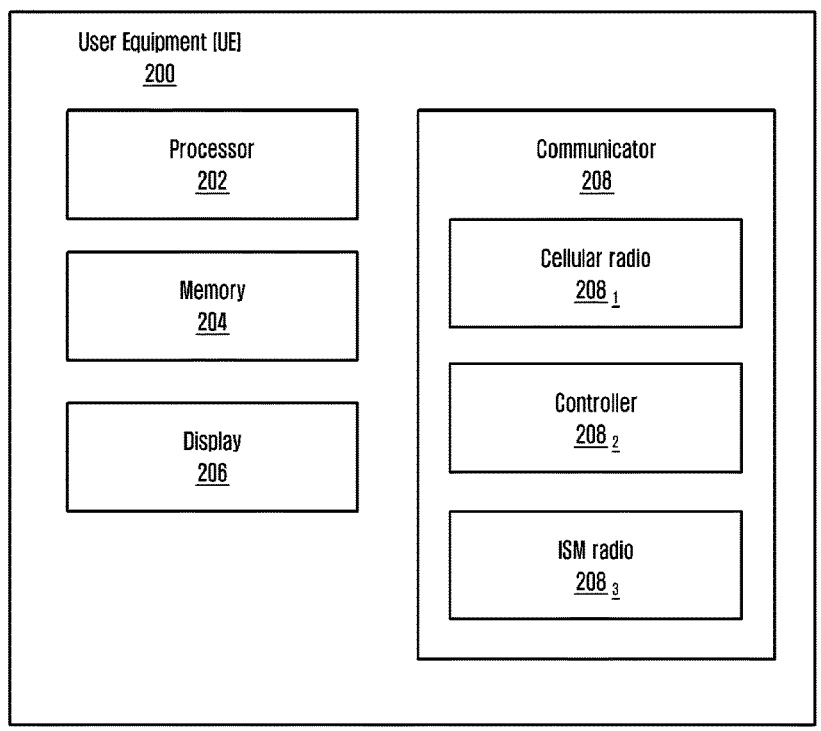

[Fig. 3]
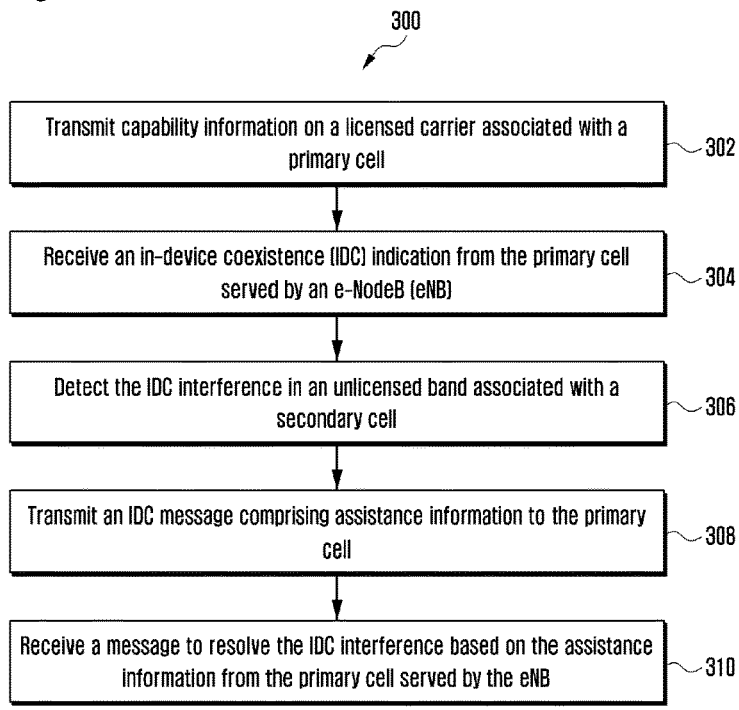
[Fig. 4]
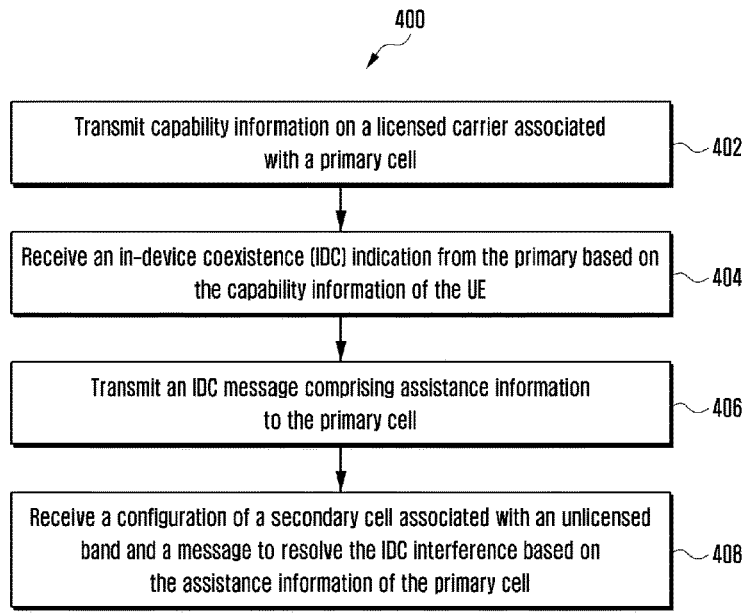
[Fig. 5]
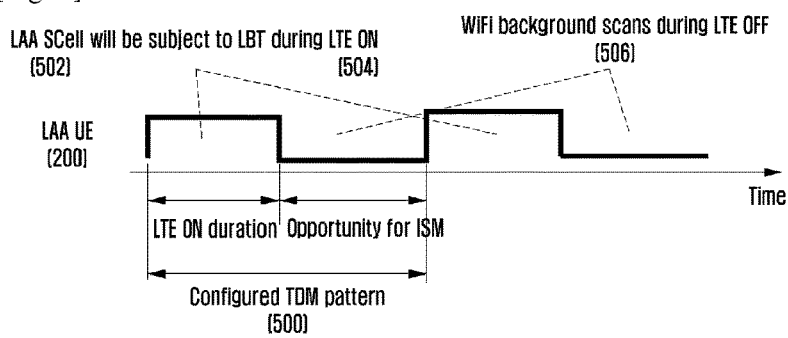

[Fig. 6a]
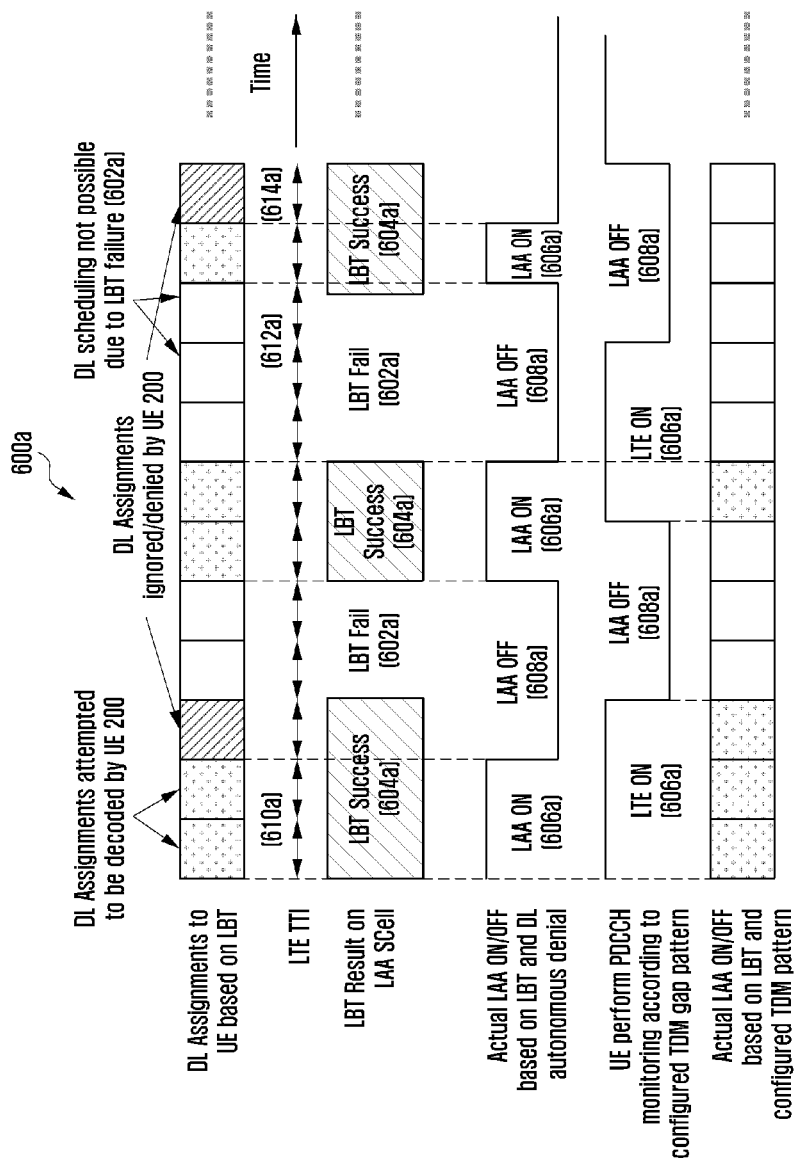

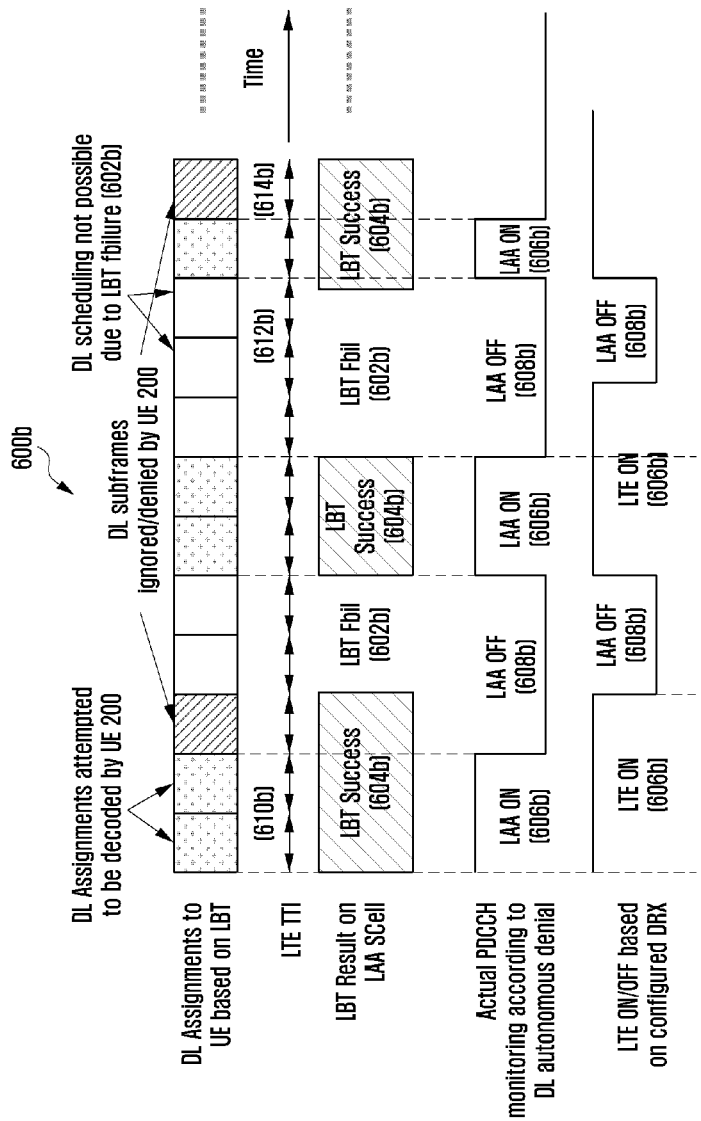
[Fig. 6b]

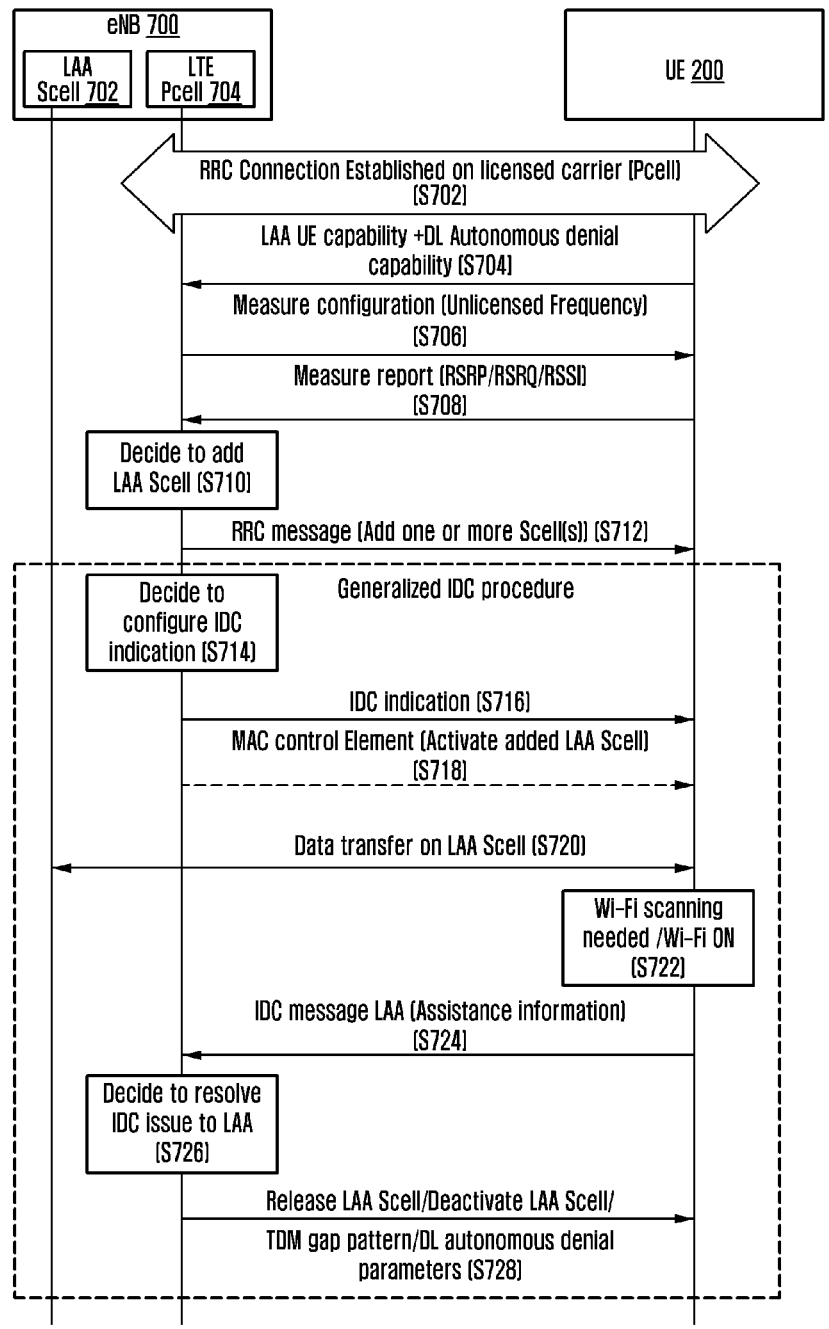

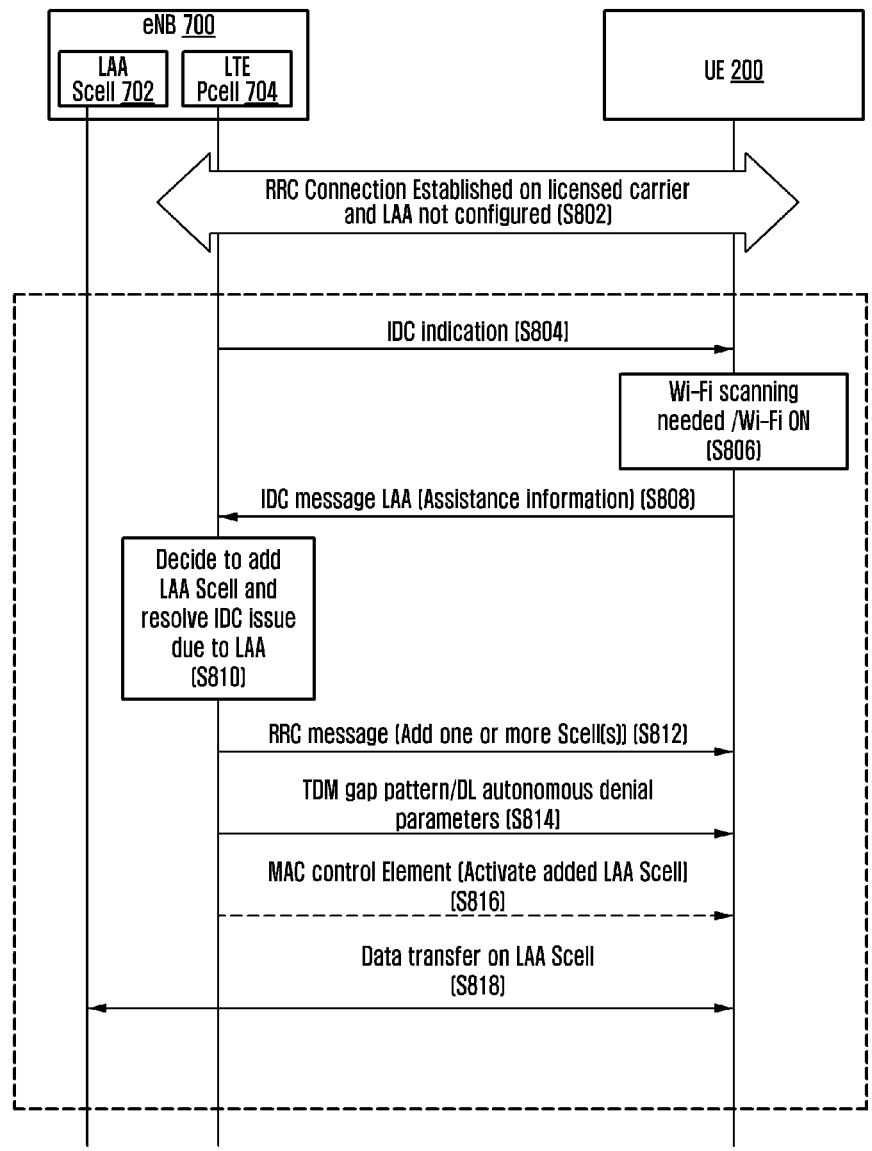
[Fig. 8]

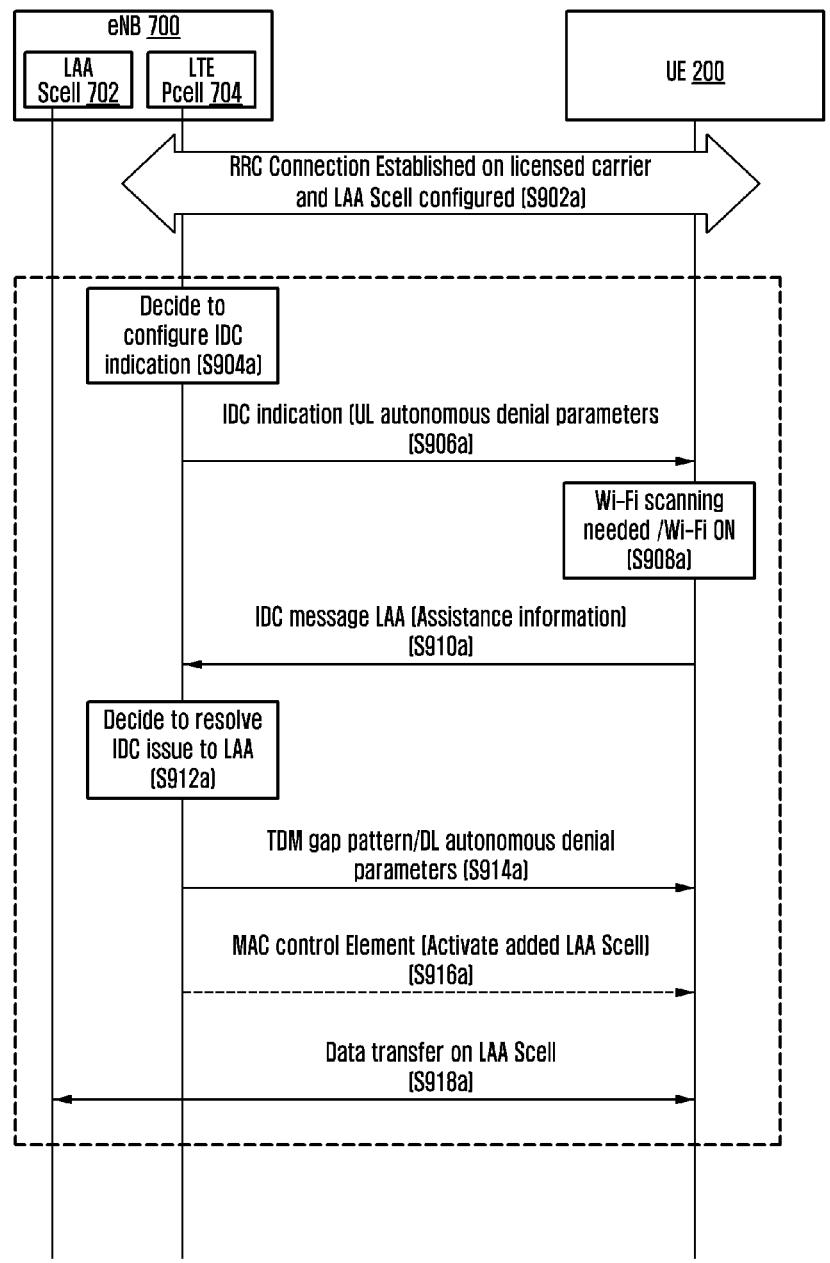

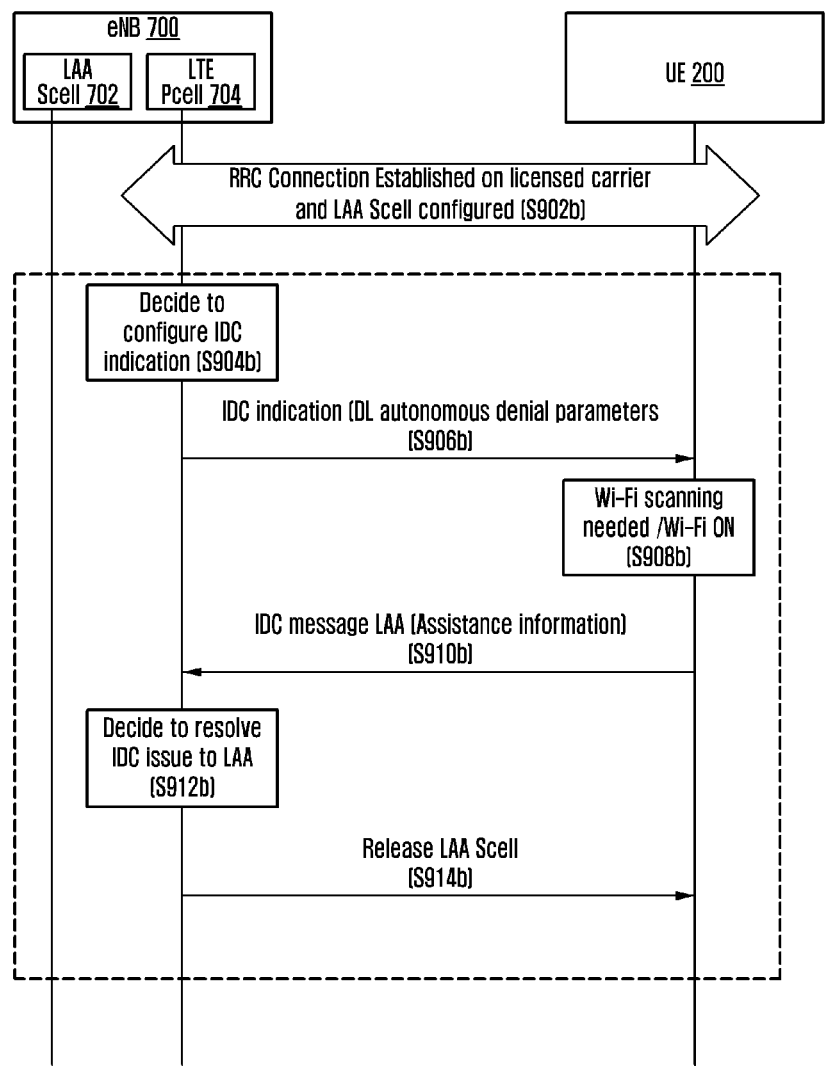

[Fig. 10]
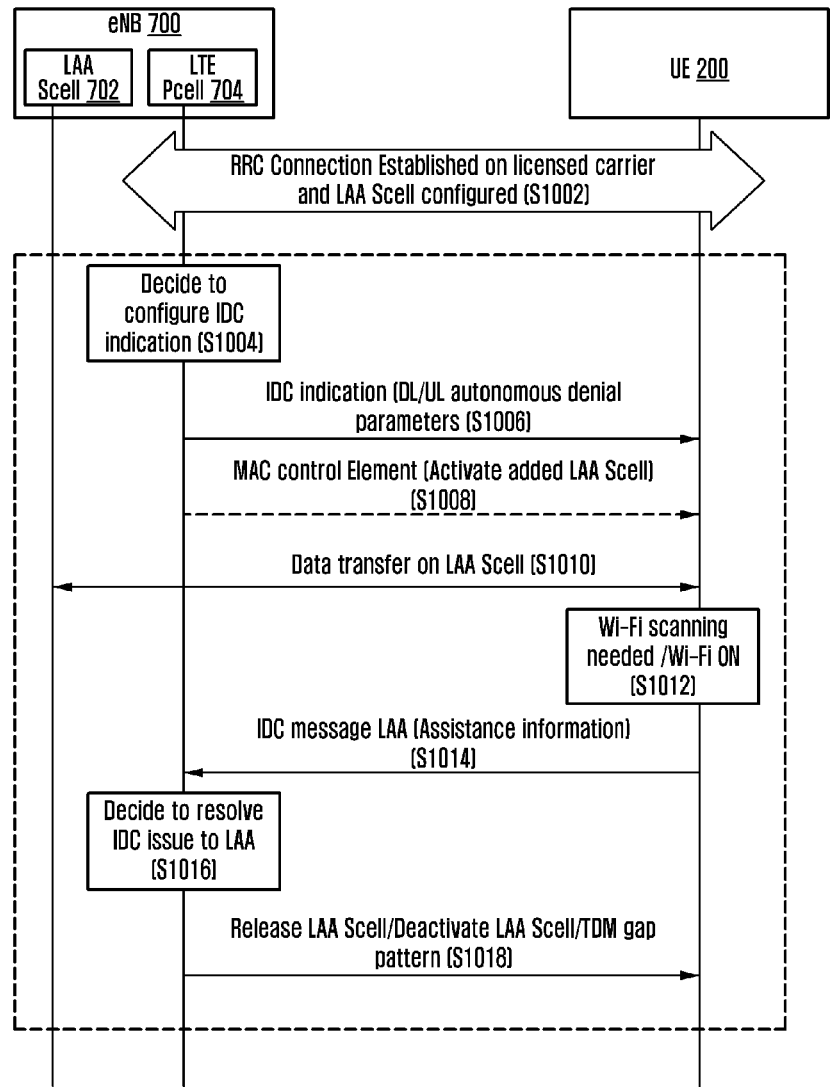
[Fig. 11]
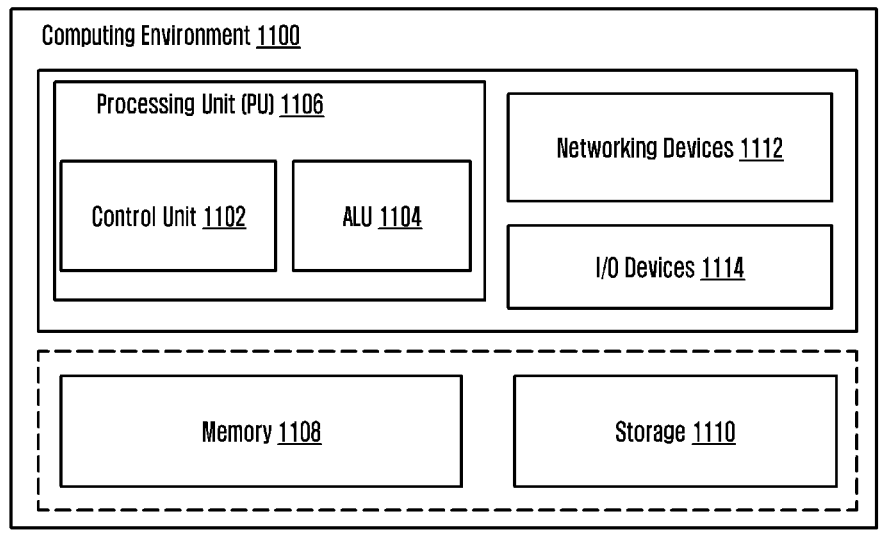

METHOD AND UE FOR MANAGING IN-DEVICE CO-EXISTENCE (IDC) ISSUE

TECHNICAL FIELD

The present invention relates to wireless communication systems, and more particularly, to method for managing in device co-existence (IDC) issue in a User Equipment (UE) due to Long Term Evolution (LTE) and Wireless Fidelity (Wi-Fi) operations in an unlicensed band. The present application is based on, and claims priority from, both the Indian Application Numbers, 4886/CHE/2015 filed on 14 Sep. 2015 and 5085/CHE/2015 filed on 23 Sep. 2015, the disclosure of which is hereby incorporated by reference herein.

BACKGROUND ART

Basically, long term evolution (LTE) operation based on a licensed-assisted access (LAA) concept where a secondary cell (SCell) for a UE is served on a carrier from an unlicensed band (e.g., 5.0 GHz) while a primary cell (PCell) is served on the carrier from a licensed band. The LAA concept may be based on either the Carrier Aggregation (CA) framework or Dual Connectivity (DC) framework. Due to unlicensed nature of the secondary carrier, the UE may need to support both LAA SCell operation and wireless local area network (WLAN)/Wi-Fi operation in the unlicensed band, albeit in a time division multiplex (TDM) manner. The LAA SCell operation and the WLAN/Wi-Fi operation at the UE have to be separated either in time domain or frequency domain to circumvent an in device co-existence (IDC) interference issue; where transmission of first radio access technology (e.g., LTE) would severely interfere with reception of a second radio access technology (e.g., Wi-Fi) and vice-versa. Further, the UE may desire to perform a WLAN/Wi-Fi background scanning or plurality of WLAN/Wi-Fi operations in order to support user preferred network connectivity (i.e., desire to connect to a Wi-Fi access point if available), when a Evolved Universal Mobile Telecommunications System Terrestrial Radio Access Network (EUTRAN) has configured the UE with LAA SCell operation. The radio frequency (RF) circuitry for unlicensed band is common for LAA SCell operation and WLAN/Wi-Fi operation even though the baseband processing for LAA and WLAN/Wi-Fi is separate. In such scenario, the shared RF may lead to hardware conflict between LAA operation and WLAN/Wi-Fi operation if the UE prefers to connect WLAN/Wi-Fi access point. Such hardware conflict is also categorized as IDC issue.

When the UE is configured with measurements on LAA frequencies or LAA SCell operation then the EUTRAN shall configure IDC indication to the UE to allow the UE to send IDC message. Upon resolving the IDC issue related to either hardware conflict or interference situation the UE can perform the Wi-Fi background scanning. Without the IDC indication from EUTRAN, the UE cannot send the IDC message to resolve the IDC issue. The issue can be resolved through detach and attach procedure performed by the UE where the UE indicates changed LAA capability. It is desirable to avoid the UE detach and attach procedure from system point of view. The IDC indication configured to the UE is in the context of LAA which allows the UE to send MC message to the EU FRAN comprising assistance information to resolve MC issue. The IDC assistance information from the UE sent to the EUTRAN in the context of LAA comprises of at least: TDM gap parameters, downlink (DL) autonomous denial parameters, WLAN/Wi-Fi ON/OFF indication, LAA allowed/not allowed indication and LAA SCell de-activation request for certain period of time. The autonomous denial framework, where the UE is allowed to deny certain percentage of uplink (UL) grants is proposed to be further enhanced by allowing the UE to ignore certain percentage of DL assignments or DL subframes on the LAA SCell during the L It active time.

The LAA SCell and the Wi-Fi channel cannot be active at the same time (i.e., concurrently) at the UE as this can lead to the IDC issue or RF hardware conflict issue. When the UE supports the WLAN/Wi-Fi radio capability in the 5.0 GHz and if the user intend to perform the WLAN/Wi-Fi background scans so that it can switch to WLAN/Wi-Fi network connectivity upon detection of Wi-Fi access point (e.g. home Wi-Fi AP). The UE may intend to perform data access through the detected home WLAN/Wi-Fi AP, henceforth, then either the LAA SCell may be active in the TDM manner or the LAA SCell need to be disabled/de-activated at the UE (if active). Therefore, there is need for the EUTRAN to mandatorily configure the IDC indication conditioned one of reception of LAA capability of the UE or the configuration of measurement on LAA frequencies or configuration of LAA SCell so that the UE can provide assistance information to the EUTRAN. And, that, the UE is able to send IDC message so that the EUTRAN can take appropriate decision to either configure the UE with the TDM gaps/DL autonomous denial parameters or release/de-activate the LAA SCell or change the frequency of PCell from the licensed band.

The above information is presented as background information only to help the reader to understand the present invention. Applicants have made no determination and make no assertion as to whether any of the above might be applicable as Prior Art with regard to the present application.

DISCLOSURE OF INVENTION

Technical Problem

The principal object of the embodiments herein is to provide a UE for managing an IDC issue in an unlicensed band.

Another object of the embodiments herein is to configure the UE to transmit capability information on a licensed carrier associated with a primary cell, where the UE supports a Licensed Assisted Access (LAA) operation.

Another object of the embodiments herein is to configure the UE to receive an IDC indication from the primary cell served by an e-NodeB (eNB).

Another object of the embodiments herein is to configure the UE to detect the IDC issue in the unlicensed band associated with a secondary cell.

Another object of the embodiments herein is to configure the UE to transmit an IDC message comprising assistance information to the primary cell and receive a radio resource control (RRC) message from the primary cell to resolve the IDC issue based on the assistance information.

Yet another object of the embodiments herein is to configure the UE with DC indication in order to resolve the IDC issue or RF hardware conflict issue due to concurrent operation of first radio access technology (RAT) (e.g., LTE and second RAT (e.g., Wi-Fi radios) at the UE in the unlicensed band.

Yet another object of the embodiments herein is to configure the UE with DL autonomous denial parameters which allows the UE to ignore/skip/deny certain percentage of DL assignments or DL subframes on plurality of LAA SCell(s) during the LTE active time.

Yet another object of the embodiments herein is to provide assistance information to EUTRAN upon configuration of IDC indication; to help EUTRAN in deciding appropriate action to resolve the IDC issue or RF hardware conflict issue due to concurrent operation of LTE and Wi-Fi radios at the UE in an unlicensed band.

Solution to Problem

The UE includes a memory, a processor, coupled to the memory and communication module based on LTE RAT, configured to transmit capability information on a licensed carrier associated with a primary cell, wherein the UE supports a LAA operation, receive an IDC indication from the primary cell served by an eNB, detect the IDC issue in an unlicensed band associated with a secondary cell, transmit an IDC message comprising assistance information to the primary cell and receive a RRC message from the primary cell served by the eNB to resolve the IDC issue based on the assistance information.

In an embodiment, the capability information of the UE comprises LAA capability of the UE supporting downlink and uplink LAA operation and downlink autonomous denial capability.

In an embodiment, the IDC indication allows the UE to send IDC message and the IDC indication comprises one of an uplink autonomous denial parameter and a downlink autonomous denial parameter.

In an embodiment, the assistance information comprises at least one of a Time Domain Multiplexing (TDM) gap parameter, a downlink autonomous denial parameter, a wireless local area network (WLAN) radio status indication, a LAA status indication, and a LAA secondary cell de-activation request.

In an embodiment, the LAA status indication indicates UE cannot perform LAA operation and the LAA secondary cell de-activation request comprises a measurement object associated with the frequency from the unlicensed band and a time period for which the secondary cell is requested to be either released or de-activated.

In an embodiment, the RRC message comprises one of a TDM solution, a Frequency Division Multiplexing (FDM) solution configured to resolve the IDC issue at the UE.

In an embodiment, the FDM solution includes at least one of change of frequency of the primary cell, change of frequency of the secondary cell, release the secondary cell and temporarily de-activate the secondary cell reported by the UE.

In an embodiment, the TDM solution comprises at least one of a TDM gap pattern and a downlink autonomous denial parameter associated with the percentage of DL assignments UE is allowed to deny.

In an embodiment, UE detects the IDC issue either due to interference or RF hardware conflict due to an activated LAA secondary cell operation and a wireless local area network (WLAN) operation on the unlicensed band associated with a frequency either adjacent to or overlapping the secondary cell.

In an embodiment, the DL autonomous denial capability allows the UE to perform one of ignoring, denying and skipping certain percentage of DL assignments scheduled on one or more DL subframes during LAA active time.

In an embodiment, the UE considers a DL subframe as denied DL subframe by one of: skipping a Physical Downlink Control Channel (PDCCH) monitoring of the DL subframe during LAA active time and skipping only Physical Downlink Shared Channel (PDSCH) decoding upon the PDCCH monitoring of the DL subframe and identifying the presence of DL assignment associated with the DL subframe.

In an embodiment, the UE considers the DL subframe not as denied DL subframe by one of: performing PDCCH monitoring of the DL subframe and decoding the PDSCH upon identifying the presence of DL assignment associated with the DL subframe and performing PDCCH monitoring of the DL subframe even if there is no DL assignment associated with the DL subframe.

In an embodiment, a Discontinuous Reception (DRX) operation based on DRX timers such on-Duration Timer, DRX-Inactivity Timer and DRX-Retransmission Timer the UE consider both the not denied DL subframe and the denied DL subframe toward DRX timer counting.

Accordingly the invention provides a method for managing an IDC issue at the UE in an unlicensed band. The method includes transmitting, by the UE, capability information on a licensed carrier associated with a primary cell, wherein the UE supports a Licensed Assisted Access (LAA) operation, receiving, by the UE, an IDC indication from the primary cell served by an eNB, detecting, by the UE, the IDC issue in an unlicensed band associated with a secondary cell, transmitting, by the UE, an IDC message comprising assistance information to the primary cell and receiving, by the UE, a RRC message from the primary cell to resolve the IDC issue based on the assistance information.

Accordingly the invention provides an eNB for managing an IDC issue at a UE in an unlicensed band. The eNB includes a memory, a processor, coupled to the memory, the processor, and communication module based on LTE RAT configured to: receive capability information of the UE on a licensed carrier associated with a primary cell served by the eNB, transmit, from the primary cell served by the eNB, an IDC indication to the UE, receive an IDC message indicating the IDC issue in an unlicensed band associated with a secondary cell from the UE, wherein the IDC message comprises assistance information, and transmit a RRC message to the UE to resolve the IDC issue based on the assistance information.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

Accordingly the invention provides a UE for managing an IDC issue in the unlicensed band.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 1 is illustration of LTE sub frame depicting time-frequency resource elements;

FIG. 2 illustrates a block diagram of a UE for managing IDC issue, according to an embodiment as disclosed herein;

FIG. 3 is a flow diagram illustrating a generalized message sequence flow between UE and eNB for managing IDC issue, when LAA SCell is configured to the UE, according to embodiments as disclosed herein;

FIG. 4 is a flow diagram illustrating a message sequence flow between a UE and eNB for managing IDC issue, when LAA SCell is not yet configured to the UE, according to embodiments as disclosed herein;

FIG. 5 illustrates a UE configured with a TDM gap pattern comprising LTE ON and LTE OFF periods in time domain, according to an embodiment as disclosed herein;

FIGS. 6a and 6b illustrates an example of outcome of LBT procedure performed by eNB on an unlicensed carrier, according to embodiments as disclosed herein;

FIG. 7 illustrates a generalized message sequence flow between UE and eNB to enable co-existence solution, when LAA SCell is configured to the UE, according to embodiments as disclosed herein;

FIG. 8 illustrates a message sequence flow between a UE and eNB to enable co-existence solution when LAA SCell is not yet configured to the UE, according to embodiments as disclosed herein;

FIGS. 9a and 9b illustrates a message sequence flow between a UE and eNB to enable co-existence solution when LAA SCell is configured to the UE but not yet activated, according to embodiments as disclosed herein;

FIG. 10 illustrates the message sequence flow between UE and eNB to enable co-existence solution when LAA SCell is configured to the UE and activated, according to embodiments as disclosed herein; and FIG. 11 illustrates a computing environment implementing the method for managing the IDC issue, according to embodiments as disclosed herein.

MODE FOR THE INVENTION

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The terms LAA operation and LTE Unlicensed (LTE-U) operation are used interchangeably throughout the disclosure/invention. The terms Wi-Fi operation and WLAN operation are used interchangeably throughout the disclosure. The various aspects of the embodiments herein are described and understood in detail when considered in conjunction with the carrier aggregation (CA) framework. It should be understood, however, that the following descriptions, while indicating preferred embodiments and numerous specific details thereof in conjunction with the carrier aggregation (CA) framework, are given by way of illustration and equally applicable if LAA concept is support in conjunction with the dual connectivity (DC) framework.

The embodiments herein disclose a UE for managing an IDC issue i.e. interference issue or RF hardware conflict issue in wireless communication network. The UE includes a memory, a processor, coupled to the memory, configured to: transmit capability information on a licensed carrier associated with a primary cell, wherein the UE supports a LAA operation, receive an IDC indication from the primary cell served by an eNB, detect the IDC issue in an unlicensed band associated with a secondary cell, transmit an IDC message comprising assistance information to the primary cell and receive a RRC message from the primary cell served by the eNB to resolve the IDC issue based on the assistance information.

The embodiments herein disclose a method for managing an IDC issue i.e. interference issue or RF hardware conflict issue in wireless communication network. The method includes transmitting, by a UE, capability information on a licensed carrier associated with a primary cell, wherein the UE supports a Licensed Assisted Access (LAA) operation, receiving, by the UE, an IDC indication from the primary cell served by an eNB, detecting, by the UE, the IDC issue in an unlicensed band associated with a secondary cell, transmitting, by the UE, an IDC message comprising assistance information to the primary cell and receive a RRC message from the primary cell served by the eNB to resolve the IDC issue based on the assistance information.

The embodiments herein disclose an eNB for managing an IDC interference issue or RF hardware conflict issue in wireless communication network. The eNB includes a memory, a processor, coupled to the memory, the processor configured to: receive capability information of a UE on a licensed carrier associated with a primary cell served by the eNB, transmit, from the primary cell served by the eNB, an IDC indication to the UE, receive an IDC message indicating the IDC issue in an unlicensed band associated with a secondary cell from the UE, wherein the IDC message comprises assistance information, and transmit a RRC message to resolve the IDC issue based on the assistance information to the UE.

Electronic device(s) (e.g., UE, smart devices such as: smart phones, tablets, smart watches, wearable devices, transmitter, receiver, etc.,) are equipped with multi-mode/multi-band cellular radio capability (e.g., LTE, High-Speed Packet Access (HSPA), Global System for Mobile Communications (GSM), Worldwide Interoperability for Microwave Access (WiMAX), etc.,) along with radio capability for local access like Wi-Fi, Bluetooth and other radio capability for Global Positioning System (GPS) and near field communication (NFC). Even for the local access based on the Wi-Fi, there are many electronic devices which support Wi-Fi operation in both 2.4 GHz and 5.0 GHz unlicensed band. There is discussion in 3GPP to assess the feasibility of LAA operation of the LTE based radio in the unlicensed band (e.g., 5.0 GHz). This is also referred as LTE-Unlicensed (LTE-U) operation. In the 3GPP discussion there is no requirement for the UE to support LAA/LTE-U and Wi-Fi/WLAN operation in the 5.0 GHz band concurrently (i.e., at the same time). This restriction seems reasonable given the radio frequency (RF) capability equipped in the UE to operate in the 5.0 GHz unlicensed band can be used for either LAA SCell or Wi-Fi access one at a time but not both concurrently. If concurrent LAA SCell operation and Wi-Fi operation at the UE in 5.0 GHz band is desired then it leads to severe in device co-existence (IDC) interference where transmission of one radio access technology (e.g., LTE) would severely interfere with reception of a second radio access technology (Wi-Fi) and vice-versa. The LAA SCell operation and the Wi-Fi operation at the 5.0 GHz can be supported at the UE if the respective radio access is separated either in time domain or frequency domain. However, there is no restriction to support LAA/LTE-U operation in the 5.0 GHz and Wi-Fi/WLAN operation in the 2.4 GHz unlicensed band concurrently. This seem feasible because the UE may be typically equipped with separate radio (RF) capability for the 2.4 GHz and 5.0 GHz that can handle concurrent Wi-Fi/WLAN operation in the 2.4 GHz and LAA/LTE-U SCell operation in 5.0 GHz. There is possibility that second harmonic of 2.4 GHz Wi-Fi channel may cause the IDC to LAA SCell configured at the left edge of 5.0 GHz band starting from 5.15 GHz. However, such IDC issue can be resolved with the IDC toolkit provisioned in Release-11 LTE specifications (TS 36.300 and TS 36.331).

The LAA SCell may be served on a carrier from the unlicensed band (e.g., 5.0 GHz) using the same physical layer numerology of the LTE specification (TS 36.211, TS 36.213) or a different numerology of next generation RAT (also called as 5G) based either on the CA framework or DC framework (TS 36.300, TS 36.331). FIG. 1 is illustration of LTE sub frame depicting time-frequency resource elements comprising Reference Signal resource elements (RS REs), Non reference signal resource elements (NRS REs) and other Physical signals based on physical layer numerology of the LTE specification (TS 36.211, TS 36.213).

Referring to the FIG. 1, the LTE sub frame 100 is 1 ms in duration comprising of 14 OFDM symbols 102 with normal cyclic prefix in the time domain and several orthogonal sub-carriers 104 in the frequency domain depending on the channel bandwidth (e.g., 10 MHz or 20 MHz). The granularity of the time-frequency grid in terms of one OFDM symbol and one sub-carrier is termed as resource element 101 and 103. Reference signals (RS) are transmitted on some resource elements 101 to facilitate the UE operation for a channel estimation, a data de-modulation, a synchronization, a time-frequency tracking, a channel state information (CSI) measurements, a radio resource management (RRM) measurements etc. Reference signals may be at least one of cell-specific reference signals (CRS), CSI-RS, discovery signals (DRS), UE-specific reference signals. Resource elements (RE) carrying the reference signals 101 are known signals to the UE while resource elements where reference signals are not present 103 are used for data transmission. There are other LTE physical signals transmitted on some resource elements 105 like primary synchronization signals (PSS) and secondary synchronization signals (SSS). The resource elements carrying the reference signals 101 is known to the UE by decoding the physical signals like (PSS/SSS) or may be determined based on the higher layer configuration provided by the PCell. LAA operation at the UE may be served by a carrier from the unlicensed band (e.g., 5.0 GHz) based on the LTE numerology as depicted in the FIG. 1 or next generation RAT (5G) numerology based on OFDMA but different than LTE numerology.

Unlike the conventional method, the proposed method can be utilized by the UE (configuring the UE) to concurrently operate on both LAA/LTE-U and Wi-Fi/WLAN operation in the unlicensed band (i.e., 5.0 GHz band).

Unlike the conventional method, the proposed method can be utilized by the primary cell served by the eNB to mandatorily configure the IDC indication in order to mitigate the IDC issue at the UE.

Referring now to the drawings, and more particularly to FIGS. 2 through 11, where similar reference characters denote corresponding features consistently throughout the figures, these are shown preferred embodiments.

FIG. 2 shows a block diagram of a UE 200, according to the embodiments as disclosed herein. The UE 200 can be, for example, a LLA capable UE 200, a Mobile Station (MS), a data processing device, electronic device, a Personal Computer (PC), a laptop computer, a mobile device, a smart phone, a Personal Digital Assistance (PDA), Internet of Things (IoT) device, electronic circuit and electrical circuit configured to perform the proposed method, etc. The UE 200 includes a processor 202 (for example; a hardware unit, an apparatus, a Central Processing Unit (CPU), a Graphics Processing Unit (GPU)) communicatively coupled to a memory 206 (e.g., a volatile memory and/or a non-volatile memory); the memory 206 includes storage locations configured to be addressable through the processor 202. The UE 200 includes (or, be associated with) the display 206 (example, a display screen such as a Cathode Ray Tube (CRT) display, a Liquid Crystal Display (LCD)), a Light-emitting diode (LED) being interfaced with the processor 202 configured to set the user preferences. Further, the UE 200 includes a communicator 208 (i.e., communication module based on Lit RAT); the communicator 208 includes or may be integrated with a cellular radio module 208(1) capable of operating in one or more frequency bands for LTE operation/5G operation which can be configured to communicate with the network (NW/EUTRAN) and ISM radio module 208(3) capable of operating in one or more unlicensed frequency bands for Wi-Fi, Bluetooth operation. The cellular radio module 208(1) and the ISM radio module 208(3) may be integrated in the same communicator 208 or different communicator such that activities of the cellular radio module 208(1) and the ISM radio module 208(3) are coordinated by a controller 208(2).

The processor 202, coupled to the communicator 208, may transmit the capability information on the licensed carrier associated with the primary cell (PCell), wherein the UE 200 supports the LAA operation.

The processor 202, coupled to the communicator 208, may receive the IDC indication from the PCell served by the eNB.

Further, the processor 202, coupled to the communicator 208, may detect the IDC interference issue or RF hardware conflict issue in the unlicensed band (e.g., 5 GHz) associated with a secondary cell (Scell). Furthermore, the processor 202 may transmit the IDC message comprising assistance information to the PCell and may receive the RRC message to resolve the IDC issue based on the assistance information from the PCell served by the eNB.

During the LAA SCell operation, in order to provide the UE 200 with more flexibility in terms of network connectivity, the UE 200 operating in the LAA mode detects a list of Wi-Fi/WLAN SSIDs. The UE 200 may be supporting the Wi-Fi radio capability in the unlicensed band (e.g., 5.0 GHz) and user may intend to perform Wi-Fi background scans so that it can switch to Wi-Fi network connectivity if Wi-Fi access point (AP) is detected (for e.g. home Wi-Fi AP).

Unlike the conventional UE 200 configuration, the processor 202, coupled to the communicator 208, of the UE 200 may then perform data access(ing) through the detected home Wi-Fi access point (AP). Thus, providing flexibility to the UE 200 in order to take into account user preferences on the network connectivity options.

In the conventional UE 200 configuration, where, in case, the UE 200 is configured for LAA/LTE-U radio access and the processor 202, of the UE 200, prefers to detect/search Wi-Fi/WLAN access points for Wi-Fi network connectivity then this may lead to concurrent operation of LAA and Wi-Fi (i.e. at the same time) which is not desirable. This can lead to severe IDC interference issue leading to an erroneous scenario, hence severely impacting operations on both the radio access. Also the radio frequency (RF) circuitry for unlicensed band is common for LAA SCell operation and WLAN/Wi-Fi operation even though the baseband processing for LAA and WLAN/Wi-Fi is separate. In such scenario the shared RF may lead to hardware conflict between LAA operation and WLAN/Wi-Fi operation if the UE 200 prefers to connect WLAN/Wi-Fi access point. Such hardware conflict is also categorized as IDC issue. From an interference or RF hardware conflict point of view (i.e., severe IDC issue), it does not seem reasonable that LTE-unlicensed (LTE-U)/LAA operation and WLAN/Wi-Fi operation to be active at the same time (i.e., concurrently) within the UE 200. This can lead to severe IDC issues which cannot be resolved by the UE 200 itself and hence impact the operation on both LAA/LTE-U and Wi-Fi/WLAN interfaces.

Unlike the conventional UE 200 configuration and the method, the proposed UE 200 can be configured to share the spectrum on timely basis which can be configured by the NW/EUTRAN, as both the LAA/LTE-U and the Wi-Fi/WLAN operate on carriers/channels served from the unlicensed spectrum (e.g., 5.0 GHz band).

It may be possible to reuse 3GPP specified Release-11 IDC solution to support the UE 200 for Wi-Fi background scanning for channels in 5.0 GHz by providing TDM gap pattern as shown in FIG. 3. This would then mean that when the UE 200 is configured for LAA SCell operation by NW/EUTRAN; then the UE 200 shall also be configured for IDC indication. During measurement configuration of LAA frequencies or the LAA SCell configuration/operation if the EUTRAN does not configure the UE 200 with the IDC indication then to perform Wi-Fi operation as desired by the UE 200; it may perform detach and attach procedure and indicate change in LAA radio capabilities to NW/EUTRAN. Such detach and attach procedure followed by changed LAA capabilities is undesirable from system point of view. Changed LAA capability means UE 200 may inform the NW/EUTRAN that it does not support LAA mode and that the IDC indication is not configured to the UE 200. If the IDC indication is configured to the UE 200 then if needed (i.e., UE 200 intends to perform Wi-Fi background scanning or plurality of Wi-Fi operation) the UE 200 may request the NW/EUTRAN to provide appropriate solution (TDM or FDM) by providing assistance information to the EUTRAN (eNB)).

Thus, unlike the conventional method, the proposed method allows the EUTRAN to mandatorily configure the IDC indication to the UE 200 conditioned on the measurement configuration of frequencies from unlicensed bands or configuration of LAA SCell so that the UE 200 can provide assistance information to the EUTRAN.

In an embodiment if the autonomous denial parameters are configured along with the IDC indication by the EUTRAN then the UE 200 may use autonomous denial to deny/skip/ignore at least: UL grants, DL assignments, DL subframes to facilitate Wi-Fi background scanning.

Even though Release-11 IDC mechanism is provisioned in LTE specification (TS 36.300, TS 36.331) the configuration is optional from NW/EUTRAN perspective. Further, the IDC assistance information (TDM and FDM assistance information) that the UE 200 can provide to the NW/EUFRAN after been configured with thee IDC indication is not sufficient to resolve the IDC issue due to configuration of LAA SCell operation. The Release-11 IDC solution is not only optional but also inefficient from LAA operation perspective if the TDM gaps are configured for the UE 200 by NW/EUTRAN.

FIG. 3 is a flow diagram 300 illustrating a generalized message sequence flow between the UE 200 and eNB for managing IDC issue, when LAA SCell is configured to the UE 200, according to embodiments as disclosed herein.

In step 302, the method includes transmitting the capability information on the licensed carrier associated with the primary cell, wherein the UE 200 supports the LAA operation. In an embodiment, the method allows the processor 202 to transmit the LAA capability information on the licensed carrier associated with the primary cell, wherein the UE 200 supports the LAA operation.

In step 304, the method includes receiving the IDC indication from the primary cell served by the eNB. In an embodiment, the method allows the processor 202 to receive the IDC indication from the primary cell served by the eNB.

In step 306, the method includes detecting the IDC interference issue or RF hardware conflict issue in the unlicensed band associated with the secondary cell. In an embodiment, the method allows the processor 202 to detect the IDC interference issue or RF hardware conflict issue in the unlicensed band associated with the secondary cell.

In step 308, the method includes transmitting the IDC message comprising assistance information to the primary cell. In an embodiment, the method allows the processor 302 to transmit the IDC message comprising assistance information to the primary cell.

In step 310, the method includes receiving the RRC message to resolve the IDC issue based on the assistance information. In an embodiment, the method allows the processor 202 to receive the message to resolve the IDC issue based on the assistance information.

FIG. 4 is a flow diagram 400 illustrating a message sequence flow between the UE 200 and the eNB for managing IDC issue, when LAA SCell is not yet configured to the UE 200, according to embodiments as disclosed herein.

In step 402, the method includes transmitting the LAA capability information on the licensed carrier associated with the primary cell, wherein the UE supports the LAA operation. In an embodiment, the method allows the processor 202 to transmit the LAA capability information on the licensed carrier associated with the primary cell, wherein the UE supports the LAA operation.

In step 404, the method includes receiving the IDC indication from the primary cell served by the eNB. In an embodiment, the method allows the processor 202 to receive the IDC indication from the primary cell served by the eNB.

In step 406, the method includes transmitting the IDC message comprising assistance information to the primary cell. In an embodiment, the method allows the processor 202 to transmit the IDC message comprising assistance information to the primary cell.

In step 408, the method includes receiving a configuration of the secondary cell associated with the unlicensed band and a message to resolve the DC issue based on the assistance information from the primary cell. In an embodiment, the method allows the processor 202 to receive a configuration of the secondary cell associated with the unlicensed band and a message to resolve the DC issue based on the assistance information from the primary cell.

The FIG. 5 depicts the UE 200 configured with TDM gap pattern 500 comprising LTE ON 504 and LTE OFF 506 periods in time domain. During the LTE ON 504 duration, the UE 200 may be scheduled on the configured/activated LAA Scell 502 depending upon the availability of the carrier subject to success of the Listen before Talk (LBT) procedure. The carrier frequency from unlicensed band is subject to LBT procedure for fair co-existence of different systems accessing the unlicensed spectrum. During the configured LTE OFF 506 period UE 200 is allowed to perform Wi-Fi operations such as scanning for Wi-Fi SSIDs or perform data exchange with already associated Wi-Fi APs or plurality of Wi-Fi operations. Since the TDM gap pattern 500 is configured by the NW/EUTRAN it is common understanding between the eNB and the UE 200 that the UE 200 is not available for LAA operation during the LTE OFF 506 period. During the LTE ON 504 period, the configured LAA Scell 502 is subject to LBT procedure to check the availability of the unlicensed carrier for scheduling purpose. Hence, during the LTE ON 504 period, the scheduling on the LAA SCell 502 is not guaranteed. It may be possible that the LBT procedure on the unlicensed carrier is successful during the configured LTE OFF 506 period but the NW/EUTRAN cannot use the unlicensed carrier during the LTE OFF 506 period and therefore the configuration of the TDM gap pattern 500 seems inefficient from the LAA resource utilization perspective. Therefore, there is need to provide additional assistance information through which NW/EUTRAN is aware that the IDC issue i.e. interference issue or RF hardware conflict issue is due to LAA and an efficient solution is configured to resolve the IDC issue. The LAA Scell 502 configured to the UE 200 may be active in TDM manner but not according to the configured TDM gap pattern as shown in the FIG. 5.

According to the Release-11 IDC solution specified in LTE specification (TS 36.300, TS 36.331) the UE 200 is allowed to autonomously deny UL grants within the limits indicated by the parameters autonomous Denial Subframes and autonomous Denial Validity configured by the NW/EUTRAN. The LAA SCell 502 from the unlicensed band configured to the UE 200 for LAA operation is DL only in Release-13 and support for UL LAA can be considered in future release of the LTE specification. Since Release-13 focus is DL LAA only so the autonomous denial tool offered by the Release-11 IDC toolkit cannot be used for Wi-Fi background scanning for LAA UEs operating in the NW/EUTRAN based on DL LAA only Release-13 scope. It may be possible for the EUTRAN to configure autonomous denial parameters and provide fake UL grants which the UE 200 may anyway deny for Wi-Fi/WLAN scanning. However, such a solution seems artificial and inflexible. In an embodiment, the autonomous denial can be extended to allow the UE 200 to deny the DL assignments, skip DL subframes, or skip PDCCH monitoring on plurality of activated LAA SCell(s) during LTE active time. In an embodiment certain percentage of DL assignments or DL subframes on plurality of activated LAA SCell(s) can be ignored/skipped by the UE 200 based on the configuration provided by the NW/EUTRAN, if the UE 200 wants to perform the Wi-Fi scanning.

The concept of DL autonomous denial can be in principle considered as ignoring/skipping DL subframes during LTE active time. Depending on the DL autonomous denial parameters namely DL autonomous Denial Subframes and DL autonomous Denial Validity configured by thee NW/EUTRAN, the UE 200 shall count the number of ignored/skipped DL subframes during the LTE active time in the following two ways:

If during the LTE active time when the UE 200 is expected to perform PDCCH monitoring, if the UE 200 skip the monitoring of PDCCH for a DL subframe then this subframe shall be counted as skipped DL subframe.

If during the LTE active time when the UE 200 is expected to perform the PDCCH monitoring and when the UE 200 monitors the PDCCH which occurs in the first few OFDM symbols of LTE TTI wherein; if there is a PDCCH addressed to the UE 200 pointing to a DL assignment in the PDSCH region of LTE subframe/TTI and the UE 200 ignores/skips the PDSCH decoding of the DL assignment then this subframe shall be counted as skipped DL subframe. In case when PDCCH monitoring is performed by the UE 200 but there is no DL assignment in the PDSCH addressed by the PDCCH then this subframe shall not be counted as skipped DL subframe.

FIG. 6a shows an example 600a of outcome of LBT procedure performed by the eNB on the unlicensed carrier. Since the configured SCell from the unlicensed band is subject to the LBT, the LAA operation of the UE 200 in the 5.0 GHz band is dis-continuous in nature depending on the availability of the channel/carrier. Such dis-continuous operation creates natural gap in time domain for the UE 200 depicted as LBT fail 602a. If the LBT is successful (i.e., LBT success 604a) then LTE scheduling on the concerned LAA Scell is possible. If LBT is successful then LTE sub frames or transmission time intervals (TTI) are scheduled (i.e. solid gray LTE TTIs 610a) and if the LBT fails 602a then LTE sub frames are not scheduled (i.e., solid white LTE TTIs 612a). The natural gap where no LTE scheduling is occurring can be detected by the cellular radio 208(1) in the UE 200. Upon detection of such natural gap the cellular radio module 208(1) can indicate to the ISM radio module 208(3) presence of such gaps through the controller 208(2). These natural gaps can then be used by the UE 200 for Wi-Fi background scanning or plurality of Wi-Fi operations intended on channels in the 5.0 GHz. During the natural gap the ISM radio module 208(3) (i.e., Wi-Fi radio if 5.0 GHz band is supported) can look for beacon frames broadcasted by the Wi-Fi APs advertising their SSIDs. Further, the eNB can mandatorily configure the IDC indication to the UE 200 conditioned on measurement configuration of frequencies from unlicensed bands or configuration of the LAA Scell to resolve the IDC issue related to either hardware conflict or interference issues. The IDC indication configured to the UE 200 may include DL autonomous denial parameters, UL autonomous denial parameters or both. Based on the DL and/or UL autonomous parameters; the UE 200 is allowed to deny/ignore/skip certain number of DL subframes/DL assignments and/or UL grants on plurality of activated SCell(s) during an autonomous denial validity period. This result in denying/ignoring/skipping small percentage of the PDCCH monitoring or DL assignments on the concerned LAA Scell. The solid black LTE TTI's 614a as shown in the FIG. 6a are LTE scheduled sub frames/TTIs containing DL assignments which are denied/ignored/skipped by the UE 200 or LTE subframe/TTI for which the UE 200 skips the PDCCH monitoring. DL autonomous denial is feasible because the UE 200 can simply skip PDCCH monitoring of the DL subframe or UE 200 decodes the PDCCH which occurs in the first few OFDM symbols of LTE TTI. If there is the PDCCH addressed to the UE 200 pointing to a DL assignment in the PDSCH region of L subframe/TTI then the UE 200 can ignore the DL assignment if the cellular radio module 208(1) in the UE 200 gets a trigger from the controller 208(2) that Wi-Fi radio intends to perform Wi-Fi scanning or some other Wi-Fi operation. As can be seen from FIG. 6a the DL autonomous denial capability provides more flexibility to the UE 200 in terms of handling Wi-Fi operation in the TDM manner compared to the pre-configured TDM gap pattern which seems inflexible and inefficient from LAA resource utilization point of view. In an embodiment certain percentage of DL subframes/DL assignments and/or UL grants on plurality of activated LAA SCell(s) can be ignored by the UE 200 within a configured cell group based on the configuration provided by the NW/EUTRAN, if the UE 200 wants to perform the Wi-Fi scanning.

The DL autonomous denial tool can be used to skip the PDCCH monitoring on the DL subframe or skip DL assignment in a DL subframe during the LTE active time. As shown in FIG. 6b if the UE 200 wants to perform the WiFi scanning or continue already ongoing WiFi scanning due to high priority WiFi trigger then certain percentage of DL subframes during LTE ON period can be skipped/ignored by the UE 200.

The FIG. 6b shows an example 600b of outcome of LBT procedure performed by eNB on the unlicensed carrier. Since the configured SCell from unlicensed band is subject to LBT, the LAA operation of the UE 200 in the 5.0 GHz band is dis-continuous in nature depending on the availability of the carrier. Such dis-continuous operation creates natural gap in time domain for the UE 200 is depicted as the LBT fail 602b. If the LBT is successful (i.e., LBT success 604b) then LTE scheduling is possible. If LBT is successful then LTE subframes are scheduled (i.e. solid gray LTE TTIs 610b) and if LBT fails 602a then LTE subframes are not scheduled (i.e. solid white LTE TTIs 612b). Further, the eNB shall configure IDC indication to the UE 200 to allow the UE 200 to send IDC message and to resolve the IDC issue related to either hardware conflict or interference issue and configure the UE 200 with the DL autonomous denial parameters. Based on the DL autonomous parameters UE 200 is allowed to deny/ignore/skip certain number of DL subframes during autonomous denial validity period. This results in skipping/ignoring small percentage of PDCCH monitoring or skipping DL assignments.

The solid black LTE TTIs 614b as shown in the FIG. 6b are L subframes which can potentially contain DL assignments which are skipped/ignored by the UE 200. The DL autonomous denial is complimentary solution in addition to the LTE ON/OFF DRX pattern configured to the UE 200 based on the TDM pattern requested by the UE 200. The UE 200 can skip/ignore the PDCCH monitoring/DL assignments if the cellular radio module 208(1) in the UE 200 gets a trigger from the controller 208(2) that WiFi radio intends to perform WiFi scanning or some other high priority WiFi operation is triggered. As can be seen from the FIG. 6b, the DL autonomous denial capability provides more flexibility to the UE 200 in terms of handling the WiFi operation in addition to the pre-configured DRX pattern.

FIG. 7 illustrates a generalized message sequence flow between an eNB 700 and the UE 200 to enable co-existence solution, when LAA SCell is configured to the UE 200, according to embodiments as disclosed herein.

Referring to the FIG. 7, initially the UE 200 establishes (S702) RRC connection on the licensed carrier served by the eNB 700 which then becomes the PCell from the UE 200 perspective.

The UE 200 indicates (S704) it's LAA capability in terms of support of LAA and frequency band combination since LAA is supported with carrier aggregation framework or dual connectivity framework. In addition, LAA UE 200 indicates the DL autonomous denial capability to eNB.

Upon receiving (S704) the LAA UE 200 capability information either with CA mode and/or DC mode and the DL autonomous denial capability at the eNB 700, thereof, the eNB 700 transmits (S706), from a Pcell 704, the RRC reconfiguration comprising the measurement configuration on the Pcell 704. The measurement configuration includes the measurement object corresponding to the unlicensed frequencies to be measured by the UE 200 and the reporting configuration which includes the measurement metrics to be reported by the UE 200.

Based on the measurement configuration and reporting configuration, the LAA capable UE 200 detect discovery signals (DRS) on the RS REs of one or more cells served on configured unlicensed frequencies. On detecting the DRS the one or more cells are determined based on physical cell identity (PCI). The UE 200 performs measurements on the detected DRS of the determined PCI for Radio resource management (RRM) purpose which includes the RSRP/RSRQ/RSSI measurements which are then reported (S708), by the UE 200, to the Pcell 704.

Based on the reported RRM measurements for plurality of determined cells and the data demand from the UE 200, the eNB 700 decides (S710) to configure one or more SCells to the UE 200 to be served on the unlicensed carrier.

One or more SCells served by frequencies from the unlicensed band are configured to the UE 200 within a cell group through the RRC message transmitted (S712) by the Pcell 704.

Before activating the configured plurality of LAA SCell(s) for scheduling; the eNB 700 decides to configure (S714) the LAA UE 200 with IDC indication in order to know the IDC issue situation at the UE 200. If the eNB 700 does not configure the IDC indication to the UE 200 upon configuration or activation of the LAA SCell then the UE 200 may perform detach and attach procedure with changed LAA capability. Such behavior of the UE 200 is undesirable from the LAA operation point of view; therefore the eNB 700 shall mandatorily configure IDC indication conditioned on measurement configuration of frequencies from unlicensed bands or configuration of LAA SCell to UE 200.

The eNB 700 configures (S716) the UE 200 with IDC indication which may also include the configuration of at least: UL autonomous denial parameters, DL autonomous denial parameters.

If the eNB 700 does not receive the IDC message comprising assistance information from the UE 200 then the eNB 700 determines that it is safe to activate the configured plurality of LAA SCell(s). The eNB 700 sends (S718) Medium Access Control (MAC) Control Element (CE) to activate concerned LAA SCell and hence data transfer can start (S720) occurring on the concerned activated a LAA Scell 702. However, scheduling on the concerned activated the LAA Scell 702 is subject to LBT procedure performed by the eNB 700 for the concerned activated LAA SCell.

If the UE 200 turns ON (S722) the Wi-Fi radio module or the Wi-Fi radio module which was in OFF state is turned ON due to some applications running at the UE 200 side when LAA SCell operation is active then IDC issue may occur. If UE 200 detects the IDC issue due to activated the LAA Scell 702 operation and Wi-Fi operation in 5.0 GHz band and when UE 200 is not able to resolve the IDC issue i.e. interference issue or RF hardware conflict issue on its own then the UE 200 is allowed to send IDC message to eNB 700 on the PCell 704 to resolve the IDC issue which can be related to either hardware conflict or interference situation in UE 200 with help from the NW/EUTRAN.

The UE 200 sends (S724) the IDC message indicating that the IDC issue is due to the LAA SCell 702 operation and provides assistance information to the eNB 700. The assistance information provided by the UE 200 may be helpful to the eNB 700 to resolve the IDC issue. In an embodiment, the assistance information sent by the UE 200 in the IDC message comprises at least: TDM gap parameters, DL autonomous denial parameters, Wi-Fi ON/OFF indication, LAA allowed/not allowed indication and LAA SCell de-activation request comprising the measurement object corresponding to the frequency of concerned LAA SCell. The LAA SCell de-activation includes the period of time for which the corresponding LAA SCell is requested to be de-activated.

Based on the assistance information received from the UE 200, the eNB 700 decides (S726) appropriate solution to be provided to the UE 200 to resolve the IDC issue.

The eNB 700 sends (S728) the RRC message which includes one of TDM solution or FDM solution. If FDM solution is configured for the UE 200 then the RRC message includes at least one of: release the concerned LAA SCell reported by UE 200, temporarily de-activate the concerned LAA SCell reported by the UE 200. If the TDM solution is configured for the UE 200 then the RRC message includes at least one of: TDM gap pattern, DL autonomous denial parameters.

The various steps mentioned in the FIG. 7 illustrates the generalized procedure to resolve the IDC issue at the UE 200 due to the LAA Scell 702 configuration; therefore either some of the steps can be combined, sequence of some steps can be modified or some steps can be omitted without deviating from the spirit of the illustrated procedure.

Therefore if the LAA SCell 702 operation is desired at the UE 200 then in that case there is a need to mandatorily configure the UE 200 with IDC indication so that UE 200 may inform the NW/EUTRAN (i.e., eNB 700) about IDC issue in the UE 200 for below mentioned three cases.

Case 1: LTE-U/LAA SCell 702 is not configured and frequency from unlicensed band is configured in the measurement configuration Case 2: LTE-U/LAA SCell 702 is configured but not yet activated Case 3: LTE-U/LAA SCell 702 is configured and activated Different variants of the generalized procedure depicted in FIG. 7 are illustrated in FIG. 8, FIGS. 9A-9B and FIG. 10 to handle the three cases mentioned above.

The FIG. 8 illustrates a generalized message sequence flow between UE 200 and eNB 700 to enable co-existence solution, when the LAA SCell 702 is configured to the UE 200, according to embodiments as disclosed herein.

Referring to the FIG. 8, the establishment (S802) of the RRC connection include steps, similar to the steps, (S702) to (S710) from the FIG. 7.

Before deciding to configure the LTE 200 with one or more LAA SCell(s); the eNB 700 decides to configure (S804) the UE 200 with the IDC indication to know the IDC issue i.e. interference issue or RF hardware conflict issue at the UE 200.

At the UE 200 side if the Wi-Fi radio module is ON (S806) and plurality of Wi-Fi operations are occurring then the UE 200 can send (S810) assistance information to the eNB 700 because the IDC indication is configured and one or more measurement objects concerning frequencies from unlicensed bands are configured to the UE 200.

Based on the assistance information provided (S808) by the UE 200; the eNB 700 decides (S810) to add the LAA Scell 702 and resolve IDC issue related to either hardware conflict or interference situation in UE due to LAA; the eNB 700 configures (S812) the UE 200 with one or more LAA SCell(s) and further may provide (S814) the TDM solution either based on the DRX pattern and/or DL/UL autonomous denial.

The eNB 700 can send (S816) the MAC CE to activate concerned LAA SCell 702 and hence data transfer can start (S818) occurring on the concerned activated LAA Scell 702 for data transfer and scheduling.

The various steps mentioned in the FIG. 8 illustrates the generalized procedure to resolve the IDC issue at the UE 200 due to the LAA SCell 702 configuration; therefore either some of the steps can be combined, sequence of some steps can be modified or some steps can be omitted without deviating from the spirit of the illustrated procedure.

FIGS. 9a and 9b illustrates the message sequence flow between the UE 200 and the eNB 700 to enable co-existence solution when the LAA SCell 702 is configured to the UE 200 but not yet activated, according to embodiments as disclosed herein.

Referring to the FIG. 9a, the establishment (S902a) of the RRC connection include steps, similar to the steps, (S702) to (S712) from the FIG. 7.

Upon configuring (S904a) the UE 200 with one or more LAA SCell(s); the eNB 700 decides to configure (S906a) the UE 200 with IDC indication to know the IDC issue at the UE 200. The IDC indication may include configuration of UL autonomous denial parameters as depicted in the FIG. 9a.

At the UE 200 side if Wi-Fi radio module is ON (S908a) and plurality of Wi-Fi operations are occurring then the UE 200 can send (S910a) the assistance information to the eNB 700 because the IDC indication is configured and UE 200 anticipates the IDC issue i.e. interference issue or RF hardware conflict issue based on the configured LAA SCell(s) frequencies.

Based on the assistance information provided by the UE 200; the eNB 700 decides (S912a) to add the LAA Scell 702 and resolve IDC issue related to either hardware conflict or interference issue due to LAA and further may provide (S914a) the TDM solution either based on the DRX pattern and/or DL autonomous denial parameters.

The eNB 700 sends (S916a) the MAC CE to activate concerned LAA SCell and hence data transfer can start (S918a) occurring on the concerned activated a LAA Scell 702 for data transfer and scheduling.

Referring to the FIG. 9b, the establishment (S902b) of the RRC connection include steps, similar to the steps, (S702) to (S712) from the FIG. 7.

Upon configuring the UE 200 with one or more LAA SCell(s); the eNB 700 decides (S904b) to configure the UE 200 with IDC indication to know the IDC issue at the UE 200.

The IDC indication may include configuration (S906b) of DL autonomous denial parameters by the eNB 700 to the UE 200.

At the UE 200 side if Wi-Fi radio module is ON (S908b) and plurality of Wi-Fi operations are occurring then the UE 200 can send (S910b) assistance information to the eNB 700 because the IDC indication is configured and UE 200 anticipates the IDC issue i.e. interference issue or RF hardware conflict issue based on the configured LAA SCell(s) frequencies.

Based on the assistance information provided by the UE 200; the eNB 700 decides (S912b) to add the LAA Scell 702 and resolve IDC issue related to either hardware conflict or interference situation in UE due to LAA and further the eNB 700 may release (S914b) the concerned LAA Scell 702.

FIG. 10 illustrates the message sequence flow between the eNB 700 and the UE 200 to enable co-existence solution when the LAA SCell 702 is configured to the UE 200 and activated, according to embodiments as disclosed herein.

Referring to the FIG. 10, the establishment (S1002) of the RRC connection include steps, similar to the steps, (S702) to (S712) from the FIG. 7.

Upon configuring the UE 200 with one or more LAA SCell(s); the eNB 700 decides (S1004) to configure the UE 200 with IDC indication to know the IDC issue at the UE 200.

In an alternative, the IDC indication may include configuration (S1006) of both DL and UL autonomous denial parameters by the eNB 700 to the UE 200. Upon configuring the autonomous denial parameters, the eNB 700 can send (S1008) the MAC CE to activate concerned LAA SCell and hence data transfer can start (S1010) occurring on the concerned activated LAA Scell 702 for data transfer and scheduling.

At the UE 200 side if the Wi-Fi radio module is ON (S1012) and plurality of Wi-Fi operations are occurring then the UE 200 can send (S1014) the assistance information to the eNB 700 because IDC indication is configured and UE detects IDC issue i.e. interference issue or RF hardware conflict which it cannot resolve on its own. The eNB 700 thus decides (S1016) to resolve the IDC issue to the LAA.

Based on the assistance information provided by UE 200; the eNB 700 may provide (S1018) either TDM solution or FDM solution (i.e., release or de-activate concerned LAA SCell for some time period).

The DL autonomous denial is complimentary solution in addition to IDC TDM solution where UE 200 is allowed to ignore/deny/skip some DL assignments/DL subframes during LAA active time if high priority WiFi trigger comes during LTA active time. In certain situations during LTE OFF period (i.e. during DRX sleep) if WiFi scanning was triggered but the UE 200 may not complete the scan at the end of DRX sleep period and the UE 200 needs to transition to DRX ON period so the UE 200 is allowed to skip DL assignment or PDCCH monitoring of some DL subframes during the LTE ON period (i.e. LTE active time). From the UL denial perspective since the UE 200 receives the UL grant in subframe "n" but actual UL transmission occurs "n+k"; the UE 200 is allowed to skip the UL transmission at "n+k"; wherein the UE 200 decodes the UL grant at subframe "n". In that sense the UE 200 ignores PUSCH but decodes PDCCH. Similarly, for DL autonomous case if the UE 200 needs to maintain accountability of how many DL assignments has been skipped then first UE should know whether there was DL assignment or not in the PDSCH by first decoding PDCCH. If the UE 200 does not decode PDCCH then the UE 200 cannot keep accountability of DL assignment skipping. In addition the UE 200 could also skip PDCCH monitoring of DL subframe (whole TTI itself) which is simple and count as skipped DL subframe. If the UE 200 skips the PDCCH monitoring of the DL subframes then there is no need to check the PDCCH. However, even if the UE 200 skips the PDCCH monitoring then the skipped DL subframes still need to be accounted for DRX timers so that eNB 700 and the UE 200 have same understanding of the UE's LTE active time.

Following rules shall be followed by the UE 200 to consider a denied DL subframe:

When the UE 200 skips a complete DL subframe including PDCCH and PDSCH (i.e. skips PDCCH monitoring) then the UE 200 shall count this subframe as a denied DL subframe.

When the UE 200 (e.g. at the beginning of an autonomous denial period) only skips PDSCH decoding but monitors the PDCCH:

If there is a DL assignment for the UE 200 in this TTI in the PDSCH then the UE 200 shall count this subframe as a denied DL subframe.

If there is no DL assignment for the UE 200 in this TTI in the PDSCH, then in principle the UE 200 shall not count this subframe as a denied DL subframe.

In an embodiment, the UE 200 shall consider a denied/skipped DL subframe if:

PDCCH monitoring is skipped for a DL subframe then this is counted as skipped or denied DL subframe.

PDCCH monitoring is performed and a DL assignment is present in PDSCH, but the UE 200 skips decoding the DL assignment then this is also counted as skipped DL subframe.

However, if PDCCH monitoring is done but there is no DL assignment present in PDSCH then this subframe is not counted as skipped DL subframe.

However, skipping of DL subframe (i.e. DL autonomous denial) has consequences for the DRX timer counting since PDCCH monitoring and the DRX timer counting is linked. The DRX timers like on Duration Timer, DRX-Inactivity Timer, DRX-Retransmission Timer counting is based on PDCCH subframe. In an embodiment, when the UE 200 applies the DL autonomous denial the UE 200 shall account the denied/skipped DL subframe towards the DRX timers counting. This means during the active time if the UE 200 is allowed to skip DL subframe when eNB 700 is expecting PDCCH to be monitored by the UE 200, then the eNB 700 may not know the DL subframes autonomously denied by the UE 200. Therefore there is a need that the UE 200 and the eNB 700 have the same understanding on the active time which is not affected due to DL autonomous denial. For the DRX operation the eNB 700 and UE 200 can maintain the same understanding on the active time if the UE 200 shall still account the skipped/denied DL subframes towards DRX timer counting.

The IDC indication configuration in the context of LAA can be specified in LTE specification (TS 36.331) as shown in example below for the configuration of DL autonomous denial:

1> if the received otherConfig includes the idc-Config:
  2> if idc-Indication is included (i.e. set to setup):
    3> consider itself to be configured to provide IDC indications in accordance with 5.6.9;
    3> if idc-Indication-UL-CA is included (i.e. set to setup):
      4> consider itself to be configured to indicate UL CA related information in IDC indications in accordance with 5.6.9;
  2> else:
    3> consider itself not to be configured to provide IDC indications;
  2> if autonomousDenialParameters is included:
    3> consider itself to be allowed to deny any transmission in a particular UL subframe if during the number of subframes indicated by autonomousDenialValidity, preceeding and including this particular subframe, it autonomously denied fewer UL subframes than indicated by autonomousDenialSubframes;
  2> else:
    3> consider itself not to be allowed to deny any UL transmission;
  2> if dlautonomousDenialParameters is included:
    3> consider itself to be allowed to deny any DL reception or assignments in a particular DL subframe if during the number of subframes indicated by dlautonomousDenialValidity, preceeding and including this particular subframe, it autonomously denied fewer DL subframes than indicated by dl autonomous Denial Sub frames;
  2> else:
    3> consider itself not to be allowed to deny any DL reception or assignments;
1> if the received other Config includes the power PrefIndicationConfig:
  2> if power Pref Indication Config is set to setup:
    3> consider itself to be configured to provide power preference indications in accordance with 5.6.10;
  2> else:
    3> consider itself not to be configured to provide power preference indications;

Alternative example of IDC indication configuration is shown below:

1> if the received otherConfig includes the idc-Config:
  2> if idc-Indication is included (i.e. set to setup):
    3> consider itself to be configured to provide IDC indications in accordance with 5.6.9;
    3> if idc-Indication-UL-CA is included (i.e. set to setup):
      4> consider itself to be configured to indicate UL CA related information in IDC indications in accordance with 5.6.9;
    3> if idc-Indication-LAA is included (i.e. set to setup):
      4> consider itself to be configured to indicate LAA related information in IDC indications in accordance with 5.x.x;
  2> else:
    3> consider itself not to be configured to provide IDC indications;
  2> if autonomousDenialParameters is included:
    3> consider itself to be allowed to deny any transmission in a particular UL subframe if during the number of subframes indicated by autonomousDenialValidity, preceeding and including this particular subframe, it autonomously denied fewer UL subframes than indicated by autonomousDenialSubframes;
  2> else:
    3> consider itself not to be allowed to deny any UL transmission;
  2> if dlautonomousDenialParameters is included:
    3> consider itself to be allowed to deny any DL reception or assignments in a particular DL subframe if during the number of subframes indicated by dlautonomousDenialValidity, preceeding and including this particular subframe, it autonomously denied fewer DL subframes than indicated by dlautonomousDenialSubframes;
  2> else:
    3> consider itself not to be allowed to deny any DL reception or assignments;
1> if the received otherConfig includes the powerPrefIndicationConfig:
  2> if powerPrefIndicationConfig is set to setup:
    3> consider itself to be configured to provide power preference indications in accordance with 5.6.10;
  2> else:
    3> consider itself not to be configured to provide power preference indications;

The IDC indication initiation procedure can be specified in TS 36.331 as shown in example below:

5.6.9.2 Initiation

A UE capable of providing IDC indications may initiate the procedure when it is configured to provide IDC indications and upon change of IDC problem information.

Upon initiating the procedure, the UE shall:
1> if configured to provide IDC indications:
  2> if the UE did not transmit an InDeviceCoexIndication message since it was configured to provide IDC indications:
    3> if on one or more frequencies for which a measObjectEUTRA is configured, the UE is experiencing IDC problems that it cannot solve by itself; or
    3> if configured to provide IDC indications for UL CA; and if on one or more supported UL CA combination comprising of carrier frequencies for which a measurement object is configured, the UE is experiencing IDC problems that it cannot solve by itself:
      4> initiate transmission of the InDeviceCoexIndication message in accordance with 5.6.9.3;
  2> else:
    3> if the set of frequencies, for which a measObjectEUTRA is configured and on which the UE is experiencing IDC problems that it cannot solve by itself, is different from the set indicated in the last transmitted InDeviceCoexIndication message; or
    3> if for one or more of the frequencies in the previously reported set of frequencies, the interferenceDirection is different from the value indicated in the last transmitted InDeviceCoexIndication message; or 3> if the TDM assistance information is different from the assistance information included in the last transmitted InDeviceCoexIndication message; or
3> if configured to provide IDC indications for UL CA; and if the set of supported UL CA combination comprising of carrier frequencies for which a measurement object is configured and on which the UE is experiencing IDC problems that it cannot solve by itself, is different from the set indicated in the last transmitted InDeviceCoexIndication message:
3> if the DL autonomous Denial information is different from the assistance information included in the last transmitted InDeviceCoexIndication message; or
3> if the WLAN status information is different from the assistance information included in the last transmitted InDeviceCoexIndication message; or
3> if the LAA allowed indication or LAA status information is different from the assistance information included in the last transmitted InDeviceCoexIndication message; or
3> if the set of frequencies for which LAA SCell de-activation request is considered, for which a measObjectEUTRA is configured and on which the UE is experiencing IDC problems that it cannot solve by itself, is different from the set indicated in the last transmitted InDeviceCoexIndication message; or
3> if the LAA assistance information is different from the assistance information included in the last transmitted InDeviceCoexIndication message Alternative way to specify the IDC indication initiation procedure in TS 36.331 as shown in example below:

5.6.9.2 Initiation

A UE capable of providing IDC indications may initiate the procedure when it is configured to provide IDC indications and upon change of IDC problem information.

Upon initiating the procedure, the UE shall:
1> if configured to provide IDC indications:
2> if the UE did not transmit an InDeviceCoexIndication message since it was configured to provide IDC indications:
3> if on one or more frequencies for which a measObjectEUTRA is configured, the UE is experiencing IDC problems that it cannot solve by itself; or
3> if configured to provide IDC indications for UL CA; and if on one or more supported UL CA combination comprising of carrier frequencies for which a measurement object is configured, the UE is experiencing IDC problems that it cannot solve by itself:
3> if configured to provide IDC indications for LAA; and if on one or more frequencies for which a measObjectEUTRA is configured, the UE is experiencing IDC problems that it cannot solve by itself;
4> initiate transmission of the InDeviceCoexIndication message in accordance with 5.6.9.3;
2> else:
3> if the set of frequencies, for which a measObjectEUTRA is configured and on which the UE is experiencing IDC problems that it cannot solve by itself, is different from the set indicated in the last transmitted InDeviceCoexIndication message; or
3> if for one or more of the frequencies in the previously reported set of frequencies, the interferenceDirection is different from the value indicated in the last transmitted InDeviceCoexIndication message; or
3> if the TDM assistance information is different from the assistance information included in the last transmitted InDeviceCoexIndication message; or
3> if configured to provide IDC indications for UL CA; and if the set of supported UL CA combination comprising of carrier frequencies for which a measurement object is configured and on which the UE is experiencing IDC problems that it cannot solve by itself, is different from the set indicated in the last transmitted InDeviceCoexIndication message:
3> if configured to provide IDC indications for LAA; if the set of frequencies, for which a measObjectEUTRA is configured and on which the UE is experiencing IDC problems that it cannot solve by itself, is different from the set indicated in the last transmitted InDeviceCoexIndication message; or
3> if the LAA assistance information is different from the assistance information included in the last transmitted InDeviceCoexIndication message An example of transmission of the IDC message by the UE 200 to the eNB 700 to be specified in TS 36.331 is show below:

5.6.9.3 Actions Related to Transmission of InDeviceCoexIndication Message

The UE shall set the contents of the InDeviceCoexIndication message as follows:
1> if there is at least one E-UTRA carrier frequency, for which a measurement object is configured, that is affected by IDC problems:
2> include the IE affectedCarrierFreqList with an entry for each affected E-UTRA carrier frequency for which a measurement object is configured;
2> for each E-UTRA carrier frequency included in the IE affectedCarrierFreqList, include interferenceDirection and set it accordingly;
2> include Time Domain Multiplexing (TDM) based assistance information:
3> if the UE has DRX related assistance information that could be used to resolve the IDC problems:
4> include drx-CycleLength, drx-Offset and drx-ActiveTime;
3> else (the UE has desired subframe reservation patterns related assistance information that could be used to resolve the IDC problems):
4> include idc-SubframePatternList;
3> use the MCG as timing reference if TDM based assistance information regarding the SCG is included;
2> If the IE affectedCarrierFreqList for which a measurement object is configured includes LAA frequencies then include the IE laa-AssistanceInfo assistance information:
3> include DL autonomous denial based assistance information;
3> include WLAN status information based assistance information;
3> include LAA allowed indication or LAA status information based assistance information;
3> for each E-UTRA carrier frequency included in the IE affectedCarrierFreqList, include LAA SCell de-activation request and period of time for which the corresponding LAA SCell is requested to be de-activated and set it accordingly;
1> if the UE is configured to provide UL CA information and there is a supported UL CA combination comprising of carrier frequencies for which a measurement object is configured, that is affected by IDC problems:
- 2> include victimSystemType in ul-CA-AssistanceInfo;
- 2> include affectedCarrierFreqCombList in ul-CA-AssistanceInfo with an entry for each supported UL CA combination comprising of carrier frequencies for which a measurement object is configured, that is affected by IDC problems;

NOTE 1: When sending an InDeviceCoexIndication message to inform E-UTRAN the DC problems, the UE includes all assistance information (rather than providing e.g. the changed part(s) of the assistance information).

The UE shall submit the InDeviceCoexIndication message to lower layers for transmission.

Alternative example of transmission of the IDC message by the UE 200 to the eNB 700 to be specified in TS 36.331 is show below:

5.6.9.3 Actions Related to Transmission of InDeviceCoexIndication Message

The UE shall set the contents of the InDeviceCoexIndication message as follows:
- 1> if there is at least one E-UTRA carrier frequency, for which a measurement object is configured, that is affected by IDC problems:
  - 2> include the IE affectedCarrierFreqList with an entry for each affected E-UTRA carrier frequency for which a measurement object is configured;
  - 2> for each E-UTRA carrier frequency included in the IE affectedCarrierFreqList, include interferenceDirection and set it accordingly;
  - 2> include Time Domain Multiplexing (TDM) based assistance information:
    - 3> if the UE has DRX related assistance information that could be used to resolve the IDC problems:
      - 4> include drx-CycleLength, drx-Offset and drx-ActiveTime;
    - 3> else (the UE has desired subframe reservation patterns related assistance information that could be used to resolve the IDC problems):
      - 4> include idc-SubframePatternList;
    - 3> use the MCG as timing reference if TDM based assistance information regarding the SCG is included;
- 1> if the UE is configured to provide UL CA information and there is a supported UL CA combination comprising of carrier frequencies for which a measurement object is configured, that is affected by IDC problems:
  - 2> include victimSystemType in ul-CA-AssistanceInfo;
  - 2> include affectedCarrierFreqCombList in ul-CA-AssistanceInfo with an entry for each supported UL CA combination comprising of carrier frequencies for which a measurement object is configured, that is affected by IDC problems;
- 1> if the UE is configured to provide laa-AssistanceInfo and if there is at least one E-UTRA carrier frequency, for which a measurement object is configured, that is affected by IDC problems
  - 2> include laa-AssistanceInfo:
    - 3> include DL autonomous denial based assistance information;
    - 3> include WLAN status information based assistance information;
    - 3> include LAA allowed indication or LAA status information based assistance information;
    - 3> for each E-UTRA carrier frequency included in the IE affectedCarrierFreqList, include LAA SCell deactivation request and period of time for which the corresponding LAA SCell is requested to be deactivated and set it accordingly NOTE 1: When sending an InDeviceCoexIndication message to inform E-UTRAN the IDC problems, the UE includes all assistance information (rather than providing e.g. the changed part(s) of the assistance information).

The UE shall submit the InDeviceCoexIndication message to lower layers for transmission.

The ASN.1 encoding in TS 36.331 can be implemented as follows:

The IE OtherConfig contains configuration related to other configuration

OtherConfig information element

```
-- ASN1START
OtherConfig-r9 ::= SEQUENCE {
    reportProximityConfig-r9        ReportProximityConfig-r9        OPTIONAL, -- Need ON
    ...,
    [[  idc-Config-r11              IDC-Config-r11                  OPTIONAL, -- Need ON
        powerPrefIndicationConfig-r11   PowerPrefIndicationConfig-r11   OPTIONAL, -- Need ON
        obtainLocationConfig-r11    ObtainLocationConfig-r11        OPTIONAL -- Need ON
    ]]
}
IDC-Config-r11 ::=                  SEQUENCE {
    idc-Indication-r11              ENUMERATED {setup}              OPTIONAL,
    -- Need OR
    autonomousDenialParameters-r11  SEQUENCE {
        autonomousDenialSubframes-r11   ENUMERATED {n2, n5, n10, n15,
                                            n20, n30, spare2, spare1},
        autonomousDenialValidity-r11    ENUMERATED {
                                            sf200, sf500, sf1000, sf2000,
                                            spare4, spare3, spare2, spare1},
        nonCriticalExtension            DL-autonomousDenialParameters-v13xy-IEs,
    }                               OPTIONAL,                       -- Need OR
    ...,
```

```
                [[  idc-Indication-UL-CA-r11              ENUMERATED
{setup}    OPTIONAL
                -- Cond idc-Ind
                ]] ,
                [[ idc-Indication-LAA-r13                 ENUMERATED {setup}
                OPTIONAL       -- Cond idc-LAA
                ]]
            }
            DlautonomousDenialParameters-v13xy-IEs ::= SEQUENCE {
                dlautonomousDenialSubframes-r13           ENUMERATED
{n2, n5, n10, n15,
                    n20, n30, spare2, spare1},
                    dlautonomousDenialValidity-r13
                ENUMERATED {
                    sf200, sf500, sf1000, sf2000,
                    spare4, spare3, spare2, spare1},
            }
            ObtainLocationConfig-r11 ::= SEQUENCE {
                obtainLocation-r11                        ENUMERATED
{setup}               OPTIONAL
                -- Need OR
            }
            PowerPrefIndicationConfig-r11 ::= CHOICE{
                release                                   NULL,
                setup                                     SEQUENCE{
                    powerPrefIndicationTimer-r11          ENUMERATED
{s0, s0dot5, s1, s2, s5, s10, s20,
                    s30, s60, s90, s120, s300, s600, spare3,
                    spare2, spare1}
                }
            }
            ReportProximityConfig-r9 ::= SEQUENCE {
                proximityIndicationEUTRA-r9               ENUMERATED
{enabled}
                OPTIONAL,       -- Need OR
                proximityIndicationUTRA-r9                ENUMERATED
{enabled}
                OPTIONAL
                -- Need OR
            }
            -- ASN1STOP
```

TABLE 1

| Other Config field descriptions |
|---|
| Autonomous Denial Subframes |
| Indicates the maximum number of the UL subframes for which the UE is allowed to deny any UL transmission. Value n2 corresponds to 2 subframes, n5 to 5 subframes and so on. E-UTRAN does not configure autonomous denial for frequencies on which SCG cells are configured. |
| Autonomous Denial Validity |
| Indicates the validity period over which the UL autonomous denial subframes shall be counted. Value sf200 corresponds to 200 subframes, sf500 corresponds to 500 subframes and so on. |
| Dl autonomous Denial Subframes |
| Indicates the maximum number of the DL subframes for which the UE is allowed to deny any DL reception or assignment. Value n2 corresponds to 2 subframes, n5 to 5 subframes and so on. E-UTRAN does not configure autonomous denial for frequencies on which SCG cells are configured |
| Dl autonomous Denial Validity |
| Indicates the validity period over which the DL autonomous denial subframes shall be counted. Value sf200 corresponds to 200 subframes, sf500 corresponds to 500 subframes and so on. |
| idc-Indication |
| The field is used to indicate whether the UE is configured to initiate transmission of the In Device Coex Indication message to the network. |
| idc-Indication-UL-CA |
| The field is used to indicate whether the UE is configured to provide IDC indications for UL CA using the In Device Coex Indication message. |
| idc-Indication-LAA |
| The field is used to indicate whether the UE is configured to provide IDC indications for LAA using the In Device Coex Indication message. |
| Obtain Location |
| Requests the UE to attempt to have detailed location information available using GNSS. E-UTRAN configures the field only if include Location Info is configured for one or more measurements. |
| Power PrefIndication Timer |
| Prohibit timer for Power Preference Indication reporting. Value in seconds. Value s0 means prohibit timer is set to 0 second or not set, value s0dot5 means prohibit timer is set to 0.5 second, value s1 means prohibit timer is set to 1 second and so on. |
| reportProximityConfig |
| Indicates, for each of the applicable RATs (EUTRA, UTRA), whether or not proximity indication is enabled for CSG member cell(s) of the concerned RAT. Note. |

TABLE 2

| Conditional presence | Explanation |
|---|---|
| idc-LAA | The field is mandatorily present if LAA is configured, Otherwise the field is not present. |

The ASN.1 encoding in TS 36.331 for IDC message can be implemented as follows:

InDeviceCoexIndication

The InDeviceCoexIndication message is used to inform E-UTRAN about IDC problems which cannot be solved by the UE itself, as well as to provide information that may assist E-UTRAN when resolving these problems.

Signalling radio bearer: SRB1
RLC-SAP: AM
Logical channel: DCCH
Direction: UE to E UTRAN
InDeviceCoexIndication message

```
-- ASN1START
InDeviceCoexIndication-r11 ::=                    SEQUENCE {
    criticalExtensions                            CHOICE {
cl
                                                  CHOICE {
                inDeviceCoexIndication-r11
InDeviceCoexIndication-r11-IEs,
                spare3 NULL, spare2 NULL, spare1 NULL
        },
        criticalExtensionsFuture                  SEQUENCE { }
    }
}
InDeviceCoexIndication-r11-IEs ::=                SEQUENCE {
    affectedCarrierFreqList-r11
OPTIONAL,
    tdm-AssisanceInfo-r11
OPTIONAL,
    lateNonCriticalExtension         OCTET        STRING
OPTIONAL,
    nonCriticalExtension
InDeviceCoexIndication-v11xy-IEs
            OPTIONAL
}
InDeviceCoexIndication-v11xy-IEs ::= SEQUENCE {
    ul-CA-AssistanceInfo-r11            SEQUENCE {
            affectedCarrierFreqCombList-r11
OPTIONAL,
            victimSystemType-r11
    }
OPTIONAL,
    nonCriticalExtension
InDeviceCoexIndication-v13xy-IEs
            OPTIONAL
}
InDeviceCoexIndication-v13xy-IEs::= SEQUENCE {
    laa-AssistanceInfo -r13                      SEQUENCE {
    dlautonomousDenialParameters-r13 DL-autonomousDenialParameters-
r13 OPTIONAL,
    wlanstatusinformation-r13 ENUMERATED {on, off} OPTIONAL,
    laa-allowedindication-r13 ENUMERATED     {allowed,not-allowed}
OPTIONAL,
    laa-deactivationlist -r13            SEQUENCE {
    affectedCarrierFreqList-r13          AffectedCarrierFreqList-r13
            OPTIONAL
    deactivationrequest-r13 ENUMERATED {deactivate} OPTIONAL,
    deactivationvalidity-r13        ENUMERATED   {100sf,200sf,300sf,400sf
,spare4, spare3, spare2, spare1},
    OPTIONAL,
    }
    }
OPTIONAL,
    nonCriticalExtension                         SEQUENCE { }
OPTIONAL
}
    AffectedCarrierFreqList-r11 ::=   SEQUENCE (SIZE (1..maxFreqIDC-
r11)) OF AffectedCarrierFreq-r11
    AffectedCarrierFreq-r11 ::=       SEQUENCE {
        carrierFreq-r11                   MeasObjectId,
        interferenceDirection-r11    ENUMERATED {eutra, other, both,
spare}
    }
    AffectedCarrierFreqCombList-r11 ::=     SEQUENCE    (SIZE
(1..maxCombIDC-r11)) OF AffectedCarrierFreqComb-r11
    AffectedCarrierFreqComb-r11 ::= SEQUENCE (SIZE (2..maxServCell-
r10)) OF MeasObjectId
    TDM-AssistanceInfo-r11 ::=          CHOICE {
```

```
            drx-AssistanceInfo-r11              SEQUENCE {
                drx-CycleLength-r11
      ENUMERATED {sf40, sf64, sf80, sf128, sf160,
sf256, spare2, spare1},
                drx-Offset-r11
      INTEGER (0..255) OPTIONAL,
                drx-ActiveTime-r11
      ENUMERATED {sf20, sf30, sf40, sf60, sf80,
sf100, spare2, spare1},
      },
          idc-SubframePatternList-r11                   ,
              ...
      }
      }
          AffectedCarrierFreqCombList-r13 ::=     SEQUENCE  (SIZE   (1..
maxFreqIDC -r13)) OF AffectedCarrierFreq-r13
          AffectedCarrierFreq-r13 ::=         SEQUENCE {
              carrierFreq-r13                  MeasObjectId,
          IDC-SubframePatternList-r11 ::= SEQUENCE            (SIZE
(1..maxSubframePatternIDC-r11)) OF IDC-SubframePattern-r11
          IDC-SubframePattern-r11 ::= CHOICE {
              subframePatternFDD-r11                  BIT    STRING
(SIZE (4)),
              subframePatternTDD-r11              CHOICE {
                  subframeConfig0-r11
      BIT STRING (SIZE (70)),
                  subframeConfig1-5-r11                    BIT
STRING (SIZE (10)),
                  subframeConfig6-r11
      BIT STRING (SIZE (60))
              },
              ...
          }
          VictimSystemType-r11 ::= SEQUENCE {
              gps-r11
          ENUMERATED {true}
          OPTIONAL,
              glonass-r11
          ENUMERATED {true}
          OPTIONAL,
              bds-r11
          ENUMERATED {true}
          OPTIONAL,
              galileo-r11                             ENUMERATED
{true}            OPTIONAL,
              wlan-r11
          ENUMERATED {true}
          OPTIONAL,
              bluetooth-r11                           ENUMERATED
{true}
          OPTIONAL
          }
          DL-autonomousDenialParameters-r13-IEs ::=      SEQUENCE {
          dlautonomousDenialSubframes-r13                ENUMERATED
{n2, n5, n10, n15, n20, n30, spare2, spare1},
                                      dlautonomousDenialValidity-r13
          ENUMERATED {
          sf200, sf500, sf1000, sf2000,
          spare4, spare3, spare2, spare1},
          }
          -- ASN1STOP
```

TABLE 3

IDC Indication field descriptions affectedCarrierFreqCombList

Indicates a list of E-UTRA carrier frequencies that are affected by IDC problems due to Inter-Modulation Distortion and harmonics from E-UTRA when configured with UL CA. If the UE sets victim System Type to WLAN and/or Bluetooth, the UE shall include affected Carrier Freq Comb List. Otherwise it is optionally present.
affectedCarrierFreqList List of E-UTRA carrier frequencies affected by IDC problems.
dlautonomousDenialValidity Indicates the validity period over which the DL autonomous denial subframes shall be counted. Value sf200 corresponds to 200 subframes, sf500 corresponds to 500 subframes and so on.
dlautonomousDenialSubframes Indicates the maximum number of the DL subframes for which the UE is allowed to deny any DL reception or assignment. Value n2 corresponds to 2 subframes, n5 to 5 subframes and so on. E-UTRAN does not configure autonomous denial for frequencies on which SCG cells are configured.
wlanstatusinformation indicates the status of wlan. Value On indicates wlan/Wi-Fi is switched on, Value Off indicates wlan/Wi-Fi is switched off,
laa-allowedindication indicates whether LAA is allowed or not on the frequency which is experiencing or may experience IDC issue
Decativationrequest Indicates whether particular LAA frequency need to be deactivated or not
Decativationvalidity Indicates the validity period over which the LAA frequency should be deactivated

TABLE 4

IDC Indication field descriptions affectedCarrierFreqCombList

Indicates a list of E-UTRA carrier frequencies that are affected by IDC problems due to Inter-Modulation Distortion and harmonics from E-UTRA when configured with UL CA. If the UE sets victim System Type to WLAN and/or Bluetooth, the UE shall include affected Carrier Freq Comb List. Otherwise it is optionally present.
drx-ActiveTime Indicates the desired active time that the E-UTRAN is recommended to configure. Value in number of subframes. Value sf20 corresponds to 20 subframes, sf30 corresponds to 30 subframes and so on.
drx-CycleLength Indicates the desired DRX cycle length that the E-UTRAN is recommended to configure. Value in number of subframes. Value sf40 corresponds to 40 subframes, sf64 corresponds to 64 subframes and so on.
drx-Offset Indicates the desired DRX starting offset that the E-UTRAN is recommended to configure. The UE shall set the value of drx-Offset smaller than the value of drx-CycleLength. The starting frame and subframe satisfy the relation: [(SFN * 10) + subframe number] modulo (drx-CycleLength) = drx-Offset.

TABLE 5

IDC Indication field descriptions affectedCarrierFreqCombList

Indicates a list of E-UTRA carrier frequencies that are affected by IDC problems due to Inter-Modulation Distortion and harmonics from E-UTRA when configured with UL CA. If the UE sets victim System Type to WLAN and/or Bluetooth, the UE shall include affected Carrier Freq Comb List. Otherwise it is optionally present.
idc-SubframePatternList A list of one or more subframe patterns indicating which HARQ process E-UTRAN is requested to abstain from using. Value 0 indicates that E-UTRAN is requested to abstain from using the subframe. For FDD, the radio frame in which the pattern starts (i.e. the radio frame in which the first/leftmost bit of the subframePatternFDD corresponds to subframe #0) occurs when SFN mod 2 = 0. For TDD, the first/leftmost bit corresponds to the subframe #0 of the radio frame satisfying SFN mod x = 0, where x is the size of the bit string divided by 10. The UE shall indicate a subframe pattern that follows HARQ time line, as specified in TS 36.213 [23], i.e, if a subframe is set to 1 in the subframe pattern, also the corresponding subframes carrying the potential UL grant [23, 8.0], the UL HARQ retransmission [23, 8.0] and the DL/UL HARQ feedback [23, 7.3, 8.3 and 9.1.2] shall be set to 1.
interferenceDirection Indicates the direction of IDC interference. Value eutra indicates that only E-UTRA is victim of IDC interference, value other indicates that only another radio is victim of IDC interference and value both indicates that both E-UTRA and another radio are victims of IDC interference. The other radio refers to either the ISM radio or GNSS (see 3GPP TR 36.816 [63]).
victimSystemType Indicate the list of victim system types to which IDC interference is caused from E-UTRA when configured with UL CA. Value gps, glonass, bds and galileo indicates the type of GNSS. Value wlan indicates WLAN and value bluetooth indicates Bluetooth.

An example of UE behavior to be specified in TS 36.300 based on the DL autonomous denial principle is shown below:

23.4 Interference Avoidance for in-Device Coexistence

23.4.1 Problems

In order to allow users to access various networks and services ubiquitously, an increasing number of UEs are equipped with multiple radio transceivers. For example, a UE may be equipped with LTE, WiFi, and Bluetooth transceivers, and GNSS receivers. Due to extreme proximity of multiple radio transceivers within the same UE operating on adjacent frequencies or sub-harmonic frequencies, the interference power coming from a transmitter of the collocated radio may be much higher than the actual received power level of the desired signal for a receiver. This situation causes In-Device Coexistence (IDC) interference and is referred to as IDC problems. The challenge lies in avoiding or minimizing IDC interference between those collocated radio transceivers, as current state-of-the-art filter technology might not provide sufficient rejection for certain scenarios (see 3GPP TR 36.816 [50]). IDC problem can happen when the UE (intends to) uses WLAN on the overlapped carrier/band or adjacent carrier/band to the unlicensed carrier used for LAA operation. It is eNB responsibility to mandatorily configure the UE with IDC indication upon receiving the LAA capability or upon configuring the UE for LAA operation. It is eNB responsibility to mandatorily configure the UE with IDC indication upon receiving the LAA capability or upon configuring the UE for LAA operation

23.4.2 Solutions

When a UE experiences IDC problems that it cannot solve by itself and a network intervention is required, it sends an IDC indication via dedicated RRC signalling to report the IDC problems to the eNB. The UE may rely on existing LTE measurements and/or UE internal coordination to assess the interference and the details are left up to UE implementation.

In addition, once configured by the network, the UE can autonomously deny LTE UL transmission in all phases to protect ISM in rare cases if other solutions cannot be used. Conversely, it is assumed that the UE also autonomously denies ISM transmission in order to ensure connectivity with the eNB to perform necessary LTE procedures, e.g., RRC connection reconfiguration and paging reception, etc. The network may configure a long-term denial rate by dedicated RRC signalling to limit the amount of LTE UL autonomous denials. Otherwise, the UE shall not perform any LTE UL autonomous denials.

In addition, once configured by the network, the autonomous denial can be extended to allow UE to ignore DL assignments or skip PDCCH monitoring or deny any DL reception during LTE active time on one or more activated SCell served by carrier from unlicensed band in all phases to protect ISM in rare cases if other solutions cannot be used.

The principle of DL autonomous denial can be considered as ignoring/skipping DL subframes during LTE active time. The UE shall count the number of ignored/skipped DL subframes during the LTE active time in the following ways:
  If during the LTE active time when the UE is expected to perform PDCCH monitoring and if the UE skip the monitoring of PDCCH for a DL subframe then this subframe shall be counted as skipped DL subframe.
  If during the LTE active time when the UE is expected to perform PDCCH monitoring and if the UE skip the decoding of DL assignment in the PDSCH after PDCCH monitoring of the subframe then this subframe shall be counted as skipped DL subframe.
  If during the LTE active time when the UE is expected to perform PDCCH monitoring and if there is no DL assignment in the PDSCH after PDCCH monitoring of the subframe then this subframe shall not be counted as skipped DL subframe.

The network may configure a long-term denial rate by dedicated RRC signalling to limit the amount of LTE DL autonomous denials. Otherwise, the UE shall not perform any LTE DL autonomous denials.

An example of UE 200 behavior to be specified in TS 36.321 based on the DL autonomous denial principle is shown below:

3.1 Definitions

For the purposes of the present document, the terms and definitions given in TR 21.905 [1] and the following apply. A term defined in the present document takes precedence over the definition of the same term, if any, in TR 21.905 [1].

Active Time: Time related to DRX operation, as defined in subclause 5.7, during which the MAC entity monitors the PDCCH or skips DL assignment after monitoring the PDCCH.

5.7 Discontinuous Reception (DRX)

The MAC entity may be configured by RRC with a DRX functionality that controls the UE's PDCCH monitoring activity for the MAC entity's C-RNTI, TPC-PUCCH-RNTI, TPC-PUSCH-RNTI, Semi-Persistent Scheduling C-RNTI (if configured) and eIMTA-RNTI (if configured). When in RRC_CONNECTED, if DRX is configured, the MAC entity is allowed to monitor the PDCCH discontinuously using the DRX operation specified in this subclause; otherwise the MAC entity monitors the PDCCH continuously. When using DRX operation, the MAC entity shall also monitor PDCCH according to requirements found in other subclauses of this specification. RRC controls DRX operation by configuring the timers onDurationTimer, drx-InactivityTimer, drx-RetransmissionTimer (one per DL HARQ process except for the broadcast process), the longDRX-Cycle, the value of the drxStartOffset and optionally the drxShortCycleTimer and shortDRX-Cycle. A HARQ RTT timer per DL HARQ process (except for the broadcast process) is also defined (see subclause 7.7).

When a DRX cycle is configured, the Active Time includes the time while:
  onDurationTimer or drx-InactivityTimer or drx-RetransmissionTimer or mac-ContentionResolutionTimer (as described in subclause 5.1.5) is running; or
  a Scheduling Request is sent on PUCCH and is pending (as described in subclause 5.4.4); or
  an uplink grant for a pending HARQ retransmission can occur and there is data in the corresponding HARQ buffer; or
  a PDCCH-subframe is skipped by the MAC entity from PDCCH monitoring; or
  a PDCCH indicating a new transmission addressed to the C-RNTI of the MAC entity has not been received after successful reception of a Random Access Response for the preamble not selected by the MAC entity (as described in subclause 5.1.4).

FIG. 11 illustrates a computing environment implementing the method for managing the IDC issue, according to embodiments as disclosed herein. As depicted in the FIG. 11, the computing environment 1100 comprises at least one processing unit 1106 that is equipped with a control unit 1102 and an Arithmetic Logic Unit (ALU) 1104, a memory 1108, a storage unit 1110, plurality of networking devices 1112 and a plurality Input output WO) devices 1114. The processing unit 1106 is responsible for processing the instructions of the schemes. The processing unit 1106 receives commands from the control unit 1102 in order to perform its processing. Further, any logical and arithmetic operations involved in the execution of the instructions are computed with the help of the ALU 1104.

The overall computing environment 1100 can be composed of multiple homogeneous or heterogeneous cores, multiple CPUs of different kinds, special media and other accelerators. The processing unit 1106 is responsible for processing the instructions of the schemes. Further, the plurality of processing unit 1106 may be located on a single bit or over multiple bits.

The scheme comprising of instructions and codes required for the implementation are stored in either the memory 510 or the storage 1110 or both. At the time of execution, the instructions may be fetched from the corresponding memory 1108 or storage 1110, and executed by the processing unit 1106.

In case of any hardware implementations various networking devices 1112 or external I/O devices 1114 may be connected to the computing environment to support the implementation through the networking unit and the I/O device 1114.

The embodiments disclosed herein can be implemented through at least one software program running on at least one hardware device and performing network management functions to control the elements. The elements shown in the FIGS. 2 through 11 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by a terminal for avoiding interference for in-device coexistence (IDC), the method comprises:
    transmitting, to a base station, capability information on a licensed assisted access (LAA) operation of the terminal;
    receiving, from the base station, configuration information on an IDC indication, the configuration information indicating that the terminal is allowed to indicate that the terminal has a hardware sharing problem between the LAA operation and a wireless local area network (WLAN) operation, wherein the LAA operation is configured for the terminal based on the capability information and is associated with a secondary cell using an unlicensed band;
    identifying that the terminal has the hardware sharing problem on the secondary cell;
    transmitting, to the base station, an IDC indication indicating that the terminal has the hardware sharing problem based on the configuration information in case that the hardware sharing problem is identified; and
    receiving, from the base station, information indicating a de-activation of the secondary cell as a frequency division multiplexing (FDM) solution to resolve the IDC problem based on the IDC indication.

2. A terminal in a wireless communication system, comprising:
    a transceiver;
    a memory; and
    a processor, coupled to the memory and the transceiver, configured to control to:
        transmit, to a base station, capability information on a licensed assisted access (LAA) operation of the terminal,
        receive, from the base station, configuration information on an in-device coexistence (IDC) indication, the configuration information indicating that the terminal is allowed to indicate that the terminal has a hardware sharing problem between the LAA operation and a wireless local area network (WLAN) operation, wherein the LAA operation is configured for the terminal based on the capability information and is associated with a secondary cell using an unlicensed band,
        identify that the terminal has the hardware sharing problem on the secondary cell,
        transmit, to the base station, an IDC indication indicating that the terminal has the hardware sharing problem based on the configuration information in case that the hardware sharing problem is identified, and
        receive, from the base station, information indicating a de-activation of the secondary cell as a frequency division multiplexing (FDM) solution to resolve the IDC problem based on the IDC indication.

3. A method performed by a base station, the method comprises:
    receiving, from a terminal, capability information on a licensed assisted access (LAA) operation of the terminal;
    transmitting, to the terminal, configuration information on an in-device coexistence (IDC) indication, the configuration information indicating that the terminal is allowed to indicate that the terminal has a hardware sharing problem between the LAA operation and a wireless local area network (WLAN) operation, wherein the LAA operation is configured for the terminal based on the capability information and is associated with a secondary cell using an unlicensed band;
    receiving, from the terminal, an IDC indication indicating that the terminal has the hardware sharing problem as a response to the hardware sharing problem being identified by the terminal based on the configuration information, and
    transmitting, to the terminal, information indicating a de-activation of the secondary cell as a frequency division multiplexing (FDM) solution to resolve the IDC problem based on the IDC indication.

4. A base station in a wireless communication system, comprising
    a transceiver;
    a memory; and
    a processor, coupled to the memory and the transceiver, configured to:
        receive, from a terminal, capability information on a licensed assisted access (LAA) operation of the terminal,
        transmit, to the terminal, configuration information on an in-device coexistence (IDC) indication, the configuration information indicating that the terminal is allowed to indicate that the terminal has a hardware sharing problem between the LAA operation and a wireless local area network (WLAN) operation, wherein the LAA operation is configured for the terminal based on the capability information and is associated with a secondary cell using an unlicensed band,
        receive, from the terminal, an IDC indication indicating that the terminal has the hardware sharing problem as a response to the hardware sharing problem being identified by the terminal based on the configuration information, and
        transmit, to the terminal, information indicating a de-activation of the secondary cell as a frequency division multiplexing (FDM) solution to resolve the IDC problem based on the IDC indication.

* * * * *